(12) United States Patent
Park et al.

(10) Patent No.: US 12,339,481 B2
(45) Date of Patent: Jun. 24, 2025

(54) META OPTICAL DEVICE AND ELECTRONIC APPARATUS INCLUDING THE SAME

(71) Applicant: SAMSUNG ELECTRONICS CO., LTD., Suwon-si (KR)

(72) Inventors: Hyunsung Park, Suwon-si (KR); Hyeonsoo Park, Seoul (KR); Seunghoon Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 655 days.

(21) Appl. No.: 17/690,180

(22) Filed: Mar. 9, 2022

(65) Prior Publication Data
US 2023/0041415 A1 Feb. 9, 2023

(30) Foreign Application Priority Data
Aug. 6, 2021 (KR) .................. 10-2021-0104211

(51) Int. Cl.
*G02B 5/30* (2006.01)
*G02B 1/00* (2006.01)
(52) U.S. Cl.
CPC ........... *G02B 5/3083* (2013.01); *G02B 1/002* (2013.01); *G02B 2207/101* (2013.01)
(58) Field of Classification Search
CPC ............................. G02B 5/3083; G02B 1/002
USPC ...................................................... 359/489.07
See application file for complete search history.

(56) References Cited

U.S. PATENT DOCUMENTS

| | | | |
|---|---|---|---|
| 2020/0174163 A1* | 6/2020 | Han | G02B 1/002 |
| 2021/0014394 A1* | 1/2021 | Han | G02B 5/286 |
| 2021/0103075 A1 | 4/2021 | Park et al. | |
| 2021/0103141 A1 | 4/2021 | Chen et al. | |
| 2021/0132256 A1 | 5/2021 | Park et al. | |
| 2021/0271000 A1 | 9/2021 | Park et al. | |
| 2022/0082815 A1* | 3/2022 | Mun | G02B 26/06 |

FOREIGN PATENT DOCUMENTS

| | | | |
|---|---|---|---|
| EP | 3663808 A1 | | 6/2020 |
| KR | 10-2020-0067074 A | | 6/2020 |
| KR | 20210006842 A | * | 1/2021 |
| KR | 1020210006842 A | | 1/2021 |
| KR | 1020210042005 A | | 4/2021 |

OTHER PUBLICATIONS

Zhaoyi Li et al., "Meta-optics achieves RGB-achromatic focusing for virtual reality", Science Advances, vol. 7, EABE4458, Jan. 27, 2021, (9 pages).
Communication dated Oct. 18, 2022 issued by the European Patent Office in application No. 22167360.1.

* cited by examiner

*Primary Examiner* — Stephone B Allen
*Assistant Examiner* — Boutsikaris Leonidas
(74) *Attorney, Agent, or Firm* — Sughrue Mion, PLLC

(57) ABSTRACT

Provided is a meta optical device including a plurality of phase modulation regions respectively including a plurality of nanostructures and configured to modulate a phase of incident light, wherein a phase retardation profile of the plurality of phase modulation regions monotonically change with respect to light of a plurality of wavelength bands apart from each other, and wherein phase modulation ranges with respect to the light of the plurality of wavelength bands are different from each other.

19 Claims, 29 Drawing Sheets

META OPTICAL DEVICE AND ELECTRONIC APPARATUS INCLUDING THE SAME

CROSS-REFERENCE TO RELATED APPLICATION

This application is based on and claims priority to Korean Patent Application No. 10-2021-0104211, filed on Aug. 6, 2021, in the Korean Intellectual Property Office, the disclosure of which is incorporated by reference herein in its entirety.

BACKGROUND

1. Field

Example embodiments of the present disclosure relate to meta optical devices and electronic apparatuses including the same.

2. Description of Related Art

Flat-panel type diffractive devices utilizing a meta-structure may exhibit various optical effects that could not be achieved by existing refractive devices, and may implement slim optical systems. Therefore, interest in flat-panel type diffractive devices is increasing in many fields.

A meta-structure includes a nanostructure in which a numerical number less than a wavelength of incident light is applied to a shape, a period, etc. In order to implement desired optical performance, the nanostructure is designed to satisfy a phase retardation profile set for each desired position.

In general, a phase retardation profile of a meta-structure is the same for various wavelengths. On the other hand, because a refractive index of a material constituting a meta-structure depends on a wavelength, chromatic aberration is common in the meta-structure. Therefore, methods of reducing chromatic aberration are continuously being sought.

SUMMARY

One or more example embodiments provide meta optical devices with improved chromatic aberration.

One or more example embodiments provide electronic apparatuses using the meta optical devices.

Additional aspects will be set forth in part in the description which follows and, in part, will be apparent from the description, or may be learned by practice of example embodiments.

According to an aspect of an example embodiment, there is provided a meta optical device including a plurality of phase modulation regions respectively including a plurality of nanostructures and configured to modulate a phase of incident light, wherein a phase retardation profile of the plurality of phase modulation regions monotonically change with respect to light of a plurality of wavelength bands apart from each other, and wherein phase modulation ranges with respect to the light of the plurality of wavelength bands are different from each other.

The plurality of wavelength bands may be included in a red wavelength band, a green wavelength band, and a blue wavelength band, and wherein a bandwidth of each of the plurality of wavelength bands may be less than or equal to 50 nm.

Each of the plurality of phase modulation regions may have a phase modulation range of $2\pi*k$, where $|k|\geq 1$, with respect to the light of the plurality of wavelength bands, and wherein a phase modulation range corresponding to light of a first wavelength band among the plurality of wavelength bands may be less than a phase modulation range corresponding to light of a second wavelength band among the plurality of wavelength bands, the first wavelength band being longer than the second wavelength band.

Each of the plurality of phase modulation regions may have a phase modulation range of $2\pi*L$, $2\pi*M$, and $2\pi*N$, where $|L|\geq 1$, $|M|\geq 1$, $|N|\geq 1$, $L\neq M\neq N$, with respect to the light of the plurality of wavelength bands, and central wavelengths of the plurality of wavelength bands may be $\lambda 1$, $\lambda 2$, and $\lambda 3$, $L*\lambda 1 = M*\lambda 2 = N*\lambda 3$ is satisfied.

In each of the plurality of phase modulation regions, a phase retardation dispersion defined by a difference between a phase retardation profile corresponding to light of a first wavelength band among the plurality of wavelength bands and a phase retardation profile corresponding to light of a second wavelength band among the plurality of wavelength bands may monotonically change with a certain amount of change, the first wavelength band being longer than the second wavelength band.

Each of the plurality of phase modulation regions may include a first layer including a plurality of first nanostructures and a first surrounding material provided adjacent to the plurality of first nanostructures, a second layer provided on the first layer and including a plurality of second nanostructures and a second surrounding material provided adjacent to the plurality of second nanostructures, and a first zone in which sign of effective refractive index change rates according to a position of the first layer is equal to the sign of the effective refractive index change rates according to the position of the second layer, and a second zone in which the sign of the effective refractive index change rates according to the position of the first layer is opposite to the sign of the effective refractive index change rates according to the position of the second layer.

The first zone may be wider than the second zone.

Each of the first zone and the second zone may be at least one, and the first zone and the second zone may be alternately provided in one direction in each of the plurality of phase modulation regions.

A refractive index of each of the plurality of first nanostructures may be higher than a refractive index of the first surrounding material, and a refractive index of each of the plurality of second nanostructures may be lower than a refractive index of the second surrounding material.

Widths of the plurality of first nanostructures monotonically may change in one direction in a partial region within each of the plurality of phase modulation regions, and an increase or decrease of widths of each of the plurality of second nanostructures in the one direction may change one or more times in the partial region.

The plurality of first nanostructures and the plurality of second nanostructures may have a pillar shape.

Each of the plurality of second nanostructures may include a hole provided adjacent to the second surrounding material.

Each of the plurality of second nanostructures may include an inner pillar and a shell pillar provided adjacent to the inner pillar.

The inner pillar may include a material having a refractive index lower than the refractive index of the second surrounding material, and the shell pillar may include a material having a refractive index higher than the refractive index of the inner pillar.

Each of the plurality of first nanostructures and each of the plurality of second nanostructures may have a height to width ratio greater than 2.

Each of the plurality of first nanostructures and each of the plurality of second nanostructures may have a height to width ratio less than 50.

A height of each of the plurality of first nanostructures and a height of each of the plurality of second nanostructures may be greater than a central wavelength of a shortest wavelength band among the plurality of wavelength bands.

The plurality of phase modulation regions may be provided in a radial direction from a center of the meta optical device, and widths of the plurality of phase modulation regions may decrease as a distance from the center increases.

Widths of the plurality of phase modulation regions may be equal to each other.

According to another aspect of an example embodiment, there is provided an electronic apparatus including a lens assembly including a meta optical device that includes a plurality of phase modulation regions respectively including a plurality of nanostructures and configured to modulate a phase of incident light, wherein a phase retardation profile of the plurality of phase modulation regions monotonically change with respect to light of a plurality of wavelength bands apart from each other, and wherein phase modulation ranges with respect to the light of the plurality of wavelength bands are different from each other; and an image sensor configured to convert an optical image formed by the lens assembly into an electrical signal.

According to another aspect of an example embodiment, there is provided an electronic apparatus including an image projector, and a light transmitter configured to transmit image light from the image projector to a certain position, the light transmitter including the meta optical device that includes a plurality of phase modulation regions respectively including a plurality of nanostructures and configured to modulate a phase of incident light, wherein a phase retardation profile of the plurality of phase modulation regions monotonically change with respect to light of a plurality of wavelength bands apart from each other, and wherein phase modulation ranges with respect to the light of the plurality of wavelength bands are different from each other.

According to another aspect of an example embodiment, there is provided a meta optical device including a plurality of phase modulation regions respectively configured to modulate a phase of incident light, the plurality of phase modulation regions respectively including a first layer including a plurality of first nanostructures and a first surrounding material provided adjacent to the plurality of first nanostructures, a refractive index of each of the plurality of first nanostructures being higher than a refractive index of the first surrounding material, a second layer provided on the first layer and including a plurality of second nanostructures and a second surrounding material provided adjacent to the plurality of second nanostructures, a refractive index of each of the plurality of second nanostructures being lower than a refractive index of the second surrounding material, wherein a phase retardation profile of the plurality of phase modulation regions monotonically change with respect to light of a plurality of wavelength bands apart from each other.

BRIEF DESCRIPTION OF THE DRAWINGS

The above and/or other aspects, features, and advantages of example embodiments will be more apparent from the following description taken in conjunction with the accompanying drawings, in which.

DETAILED DESCRIPTION

Figure 1:
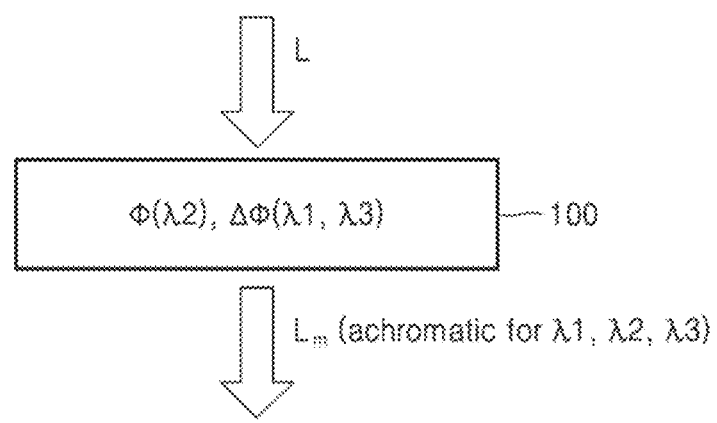
FIG. 1 is a conceptual diagram for describing a schematic configuration and function of a meta optical device according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described in detail with reference to the accompanying drawings. Example embodiments described herein are merely exemplary, and various modifications may be made thereto from these example embodiments. In the following drawings, the same reference numerals denote the same elements, and the size of each element in the drawings may be exaggerated for clarity and convenience of explanation.

Hereinafter, the terms "above" or "on" may include not only those that are directly on in a contact manner, but also those that are above in a non-contact manner.

It will be understood that although the terms "first," "second" etc. may be used herein to describe various elements, these elements should not be limited by these terms. These terms are only used to distinguish one element from another. These terms do not limit the difference in the materials or structures of the elements.

The singular forms "a," "an," and "the" as used herein are intended to include the plural forms as well unless the context clearly indicates otherwise. It will be understood that the terms "comprise," "include," or "have" as used herein specify the presence of stated elements, but do not preclude the presence or addition of one or more other elements.

Also, the terms such as "-er/or" and "module" described in the specification mean units that process at least one function or operation, and may be implemented as hardware, software, or a combination of hardware and software.

The use of the term "the" and similar demonstratives may correspond to both the singular and the plural.

Operations constituting methods may be performed in any suitable order unless otherwise indicated herein or otherwise clearly contradicted by context. The use of all illustrative terms (for example, etc.) in the embodiments is simply to describe the technical idea in detail, and the scope of the present disclosure is not limited due to the illustrative terms unless they are limited by the claims.

FIG. 1 is a conceptual diagram for describing a schematic configuration and function of a meta optical device 100 according to an example embodiment.

The meta optical device 100 is a flat-panel type diffraction device that modulates a phase of incident light L. The meta optical device 100 includes a plurality of nanostructures, and retards a phase of light passing therethrough according to a refractive index distribution formed by the arrangement of the nanostructures. The degree of phase retardation or phase delay is different according to each position that is a variable in a refractive index distribution. According to the form of the phase retardation for each position, the meta optical device 100 may exhibit various optical performances such as a lens, a beam deflector, and a beam shaper.

In the meta optical device 100 according to the example embodiment, a phase retardation and a phase retardation dispersion are set so as to form achromatic modulated light $L_m$ for light of a plurality of wavelength bands apart from each other. The light of the plurality wavelength bands may be narrow-band light, the central wavelengths of which are $\lambda 1$, $\lambda 2$, and $\lambda 3$. The width of the narrow band may be, for example, 50 nm or less, 10 nm or less, or 5 nm or less, and $\lambda 1$, $\lambda 2$, and $\lambda 3$ may be, for example, 450 nm, 540 nm, and 675 nm, respectively. In the following description, it is assumed that $\lambda 1$, $\lambda 2$, and $\lambda 3$ are 450 nm, 540 nm, and 675 nm, respectively, but the operating wavelength band of the meta optical device 100 is not limited thereto. The term achromatic indicates that there is almost no difference in the optical performance of the meta optical device 100 for each of the plurality wavelength bands, and diffraction efficiency implementing the corresponding optical performance is as high as about 85% or more or about 90% or more. For example, when the meta optical device 100 is a lens, the meta optical device 100 may exhibit substantially the same focal length for the light of the plurality wavelength bands. For example, when the meta optical device 100 is a beam deflector, the meta optical device 100 may deflect the light in the wavelength bands at substantially the same angle. For example, when the meta optical device 100 is a beam shaper, the meta optical device 100 may convert the light of the plurality wavelength bands into substantially the same pattern of light.

A phase retardation dispersion ($\Delta\varphi$) refers to a difference in a phase retardation ($\varphi$) according to a wavelength. Hereinafter, the phase retardation dispersion ($\Delta\varphi$) refers to a difference between a phase retardation for light having the shortest wavelength and a phase retardation for light having the longest wavelength among central wavelengths of the plurality of wavelength bands in which the meta optical device 100 exhibits achromatic optical performance. For example, when the central wavelengths of the plurality wavelength bands in which the meta optical device 100 exhibits achromatic optical performance are $\lambda 1$, $\lambda 2$, and $\lambda 3$ and $\lambda 1 < \lambda 2 < \lambda 3$, the phase retardation dispersion ($\Delta\varphi(\lambda 1, \lambda 3)$) is $\varphi(\lambda 1) - \varphi(\lambda 3)$.

The phase retardation of the meta optical device 100 is different for the light of the plurality wavelength bands. $\varphi(\lambda 1)$, $\varphi(\lambda 2)$, and $\varphi(\lambda 3)$ represent phase retardation profiles that monotonically change within each of a plurality of phase modulation regions provided in the meta optical device 100, and the phase modulation ranges are different from each other. Hereinafter, 'monotonically change in a region' means that 'change in a form of monotonic function in a region', that is, 'change either entirely on nonincreasing or entirely nondecreasing in a region'. Achromatic optical performance may be implemented for the light of the three wavelengths by causing an appropriate phase retardation dispersion ($\varphi(\lambda 1)-\varphi(\lambda 3)$) and a phase retardation ($\varphi(\lambda 2)$) for the light of $\lambda 2$ located in the middle of the three wavelengths to occur for the light passing through the meta optical device 100.

The phase retardation and phase retardation dispersion to be implemented by the meta optical device 100 will be described with reference to FIGS. 2 to 6.

Figure 2:
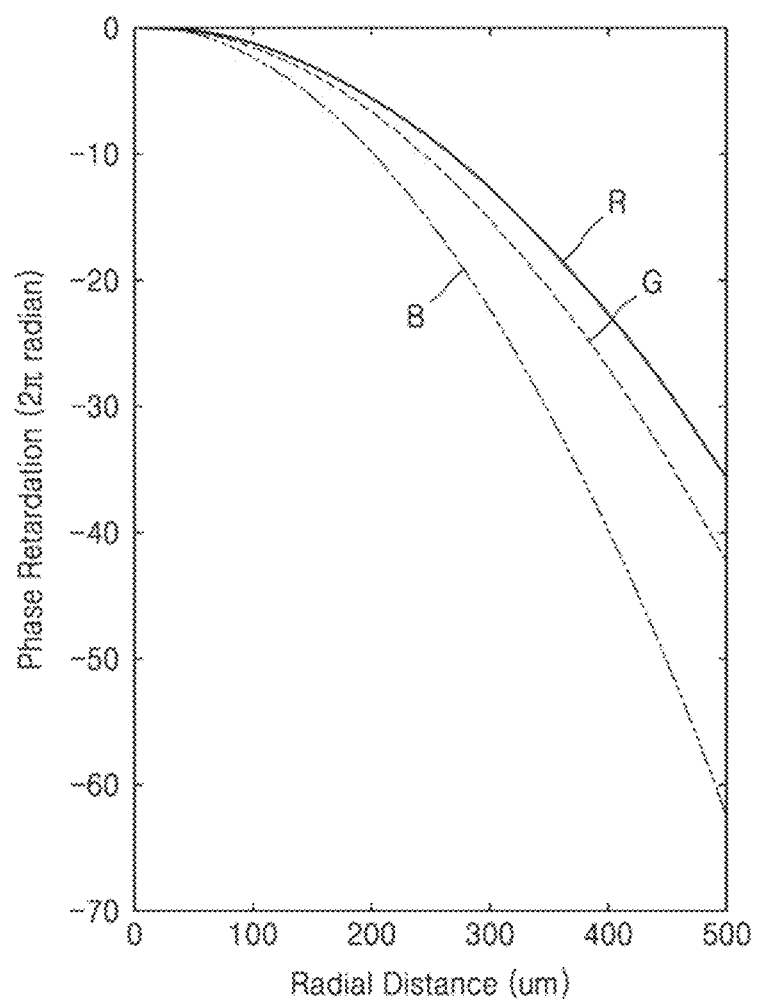
FIG. 2 illustrates a theoretical phase retardation profile showing achromatic lens performance for red (R) light, green (G) light, and blue (B) light.
Figure 3:
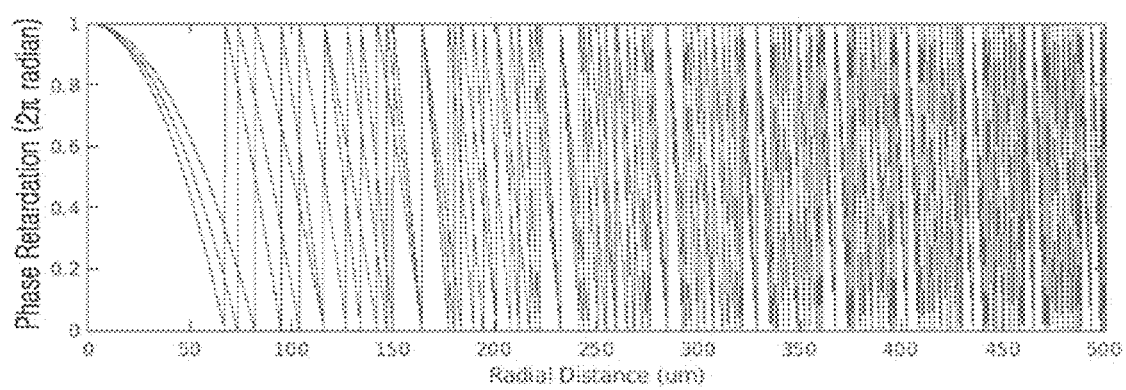
FIG. 3 is a graph obtained when the graph of FIG. 2 is changed to a $2\pi$ phase range.
Figure 4:
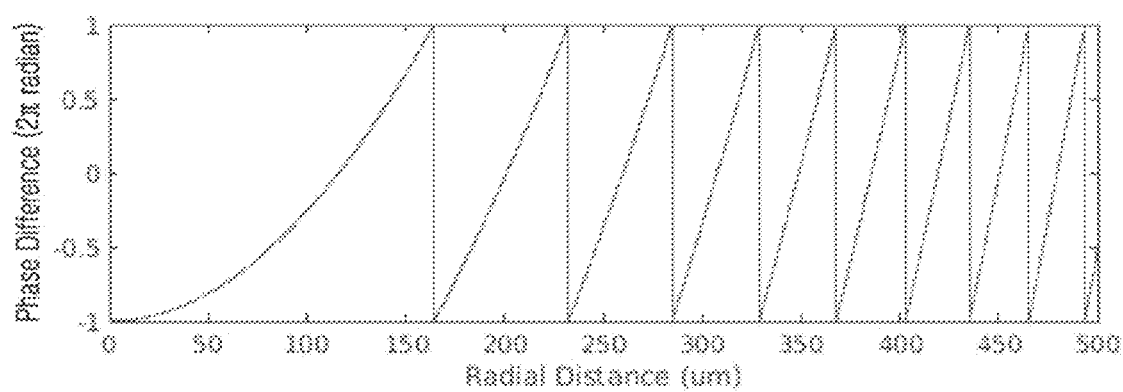
FIG. 4 is a phase retardation dispersion graph extracted from the graph of FIG. 3.

FIG. 2 illustrates a theoretical phase retardation profile showing achromatic lens performance for R light, G light, and B light, FIG. 3 is a graph obtained when the graph of FIG. 2 is changed to a $2\pi$ phase range, and FIG. 4 is a phase retardation dispersion graph extracted from the graph of FIG. 3.

The graph of FIG. 2 is a phase retardation profile including a region where a value of $\partial\varphi/\partial\lambda$ is 0, a region where a value of $\partial\varphi/\partial\lambda$ is greater than 0, and a region where a value of $\partial\varphi/\partial\lambda$ is less than 0. When the phase retardation profile is satisfied, achromatic lens performance may be exhibited. The graph of FIG. 2 is a phase retardation profile for an achromatic diffractive lens having a diameter of 1.0 mm and a focal length of 5 mm. Such a function form has different phase retardation values from each other according to a radial distance constituting the lens, and there are many restrictions in practical implementation. As the diameter of the lens increases and the focal length of the lens decreases, the aspect ratio of the nanostructure provided therein has to increase continuously, but there is a limitation to the aspect ratio that may be manufactured in practice.

The graph as shown in FIG. 3 may be extracted from FIG. 2. The graph of FIG. 3 is a form in which the phase retardation range is repeatedly changed within the range of $2\pi$. As shown in the graph, the regions where the $2\pi$ phase is repeated are different from each other for R light, G light, and B light.

On the other hand, referring to the graph of FIG. 4 in which the phase retardation is extracted from the graph of FIG. 3 for R light and G light, it is shown that the region showing the monotonous phase retardation dispersion in a range of $4\pi$ is repeated. It may be seen that such a region division shown in the phase retardation dispersion graph may be utilized for an achromatic meta optical device.

Figure 5:
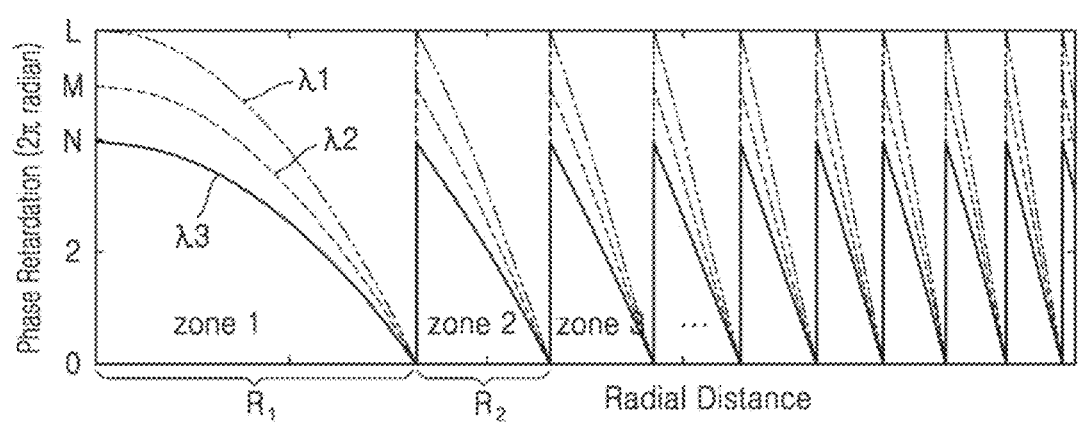
FIG. 5 is a graph showing a phase profile of a meta optical device for each wavelength according to an example embodiment.
Figure 6:
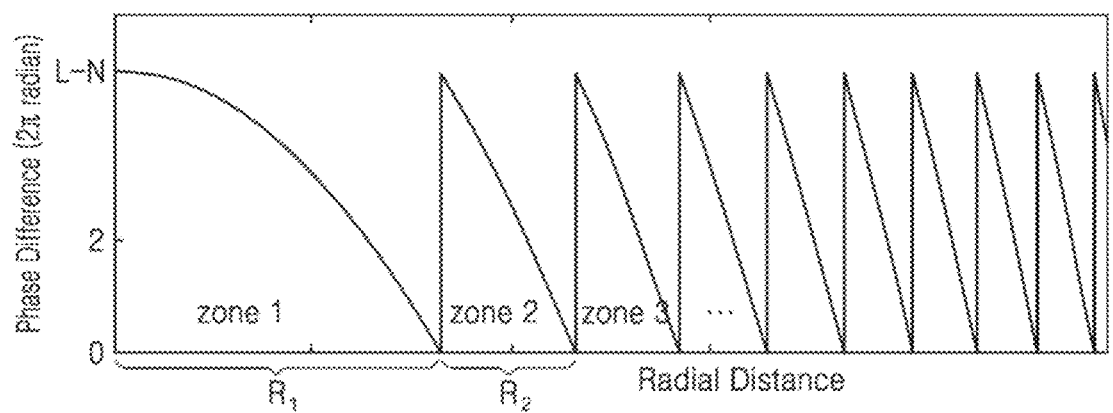
FIG. 6 is a graph showing a phase retardation dispersion of a meta optical device according to an example embodiment.

FIG. 5 is a graph showing a phase profile of a meta optical device for each wavelength, according to the example embodiment. FIG. 6 is a graph showing a phase retardation dispersion of a meta optical device according to the example embodiment.

Boundaries of a plurality of phase modulation regions $R_1$, $R_2$, etc. illustrated in FIG. 5 are defined as positions where the phase retardation dispersion changes from the maximum to the minimum. From the graph form such as the phase retardation profile illustrated in FIG. 3, the phase retardation profile as illustrated in FIG. 5 may be derived by setting a phase retardation value at a region start position so as to have a phase retardation value of 0 at the end of each region.

The phase retardation profile in each region has a phase modulation range of $2\pi*k$ ($|k|\geq 1$) for light of the plurality of wavelength bands, the central wavelengths of which are $\lambda 1$, $\lambda 2$, and $\lambda 3$. The illustrated phase retardation profiles have a smaller phase modulation range for light in a longer wavelength band than phase retardation profiles for light in a shorter wavelength band among the wavelength bands. For example, the three phase retardation profiles have phase modulation ranges of $2\pi*L$, $2\pi*M$, and $2\pi*N$ ($|L|\geq 1$, $|M|\geq 1$, $|N|\geq 1$, $L\neq M\neq N$) for light in the wavelength bands. L, M, and N may be set to satisfy the condition of $L*\lambda 1=M*\lambda 2=N*\lambda 3$. When the reciprocal of the wavelengths may be expressed as an integer ratio, that is, when $1/\lambda 1:1/\lambda 2:1/\lambda 3$ is expressed as an integer ratio, L, M, and N are also integers. When $\lambda 1$, $\lambda 2$, and $\lambda 3$ are 450 nm, 540 nm, and 675 nm, respectively, L, M, and N are 6, 5, and 4, respectively.

The graph of FIG. 6 is a graph of a phase retardation dispersion extracted from the graph of FIG. 5, and shows $\varphi(\lambda 1)-\varphi(\lambda 2)$ that the meta optical device 100 of the example embodiment satisfies. The phase retardation dispersion changes monotonically in the range of $2\pi*(L-N)$ in the phase modulation regions. When $\lambda 1$, $\lambda 2$, and $\lambda 3$ are 450 nm, 540 nm, and 675 nm, respectively, the range of the phase retardation dispersion is 47.

A more detailed structure of the meta optical device capable of implementing such phase retardation and phase retardation dispersion will be described.

Figure 7:
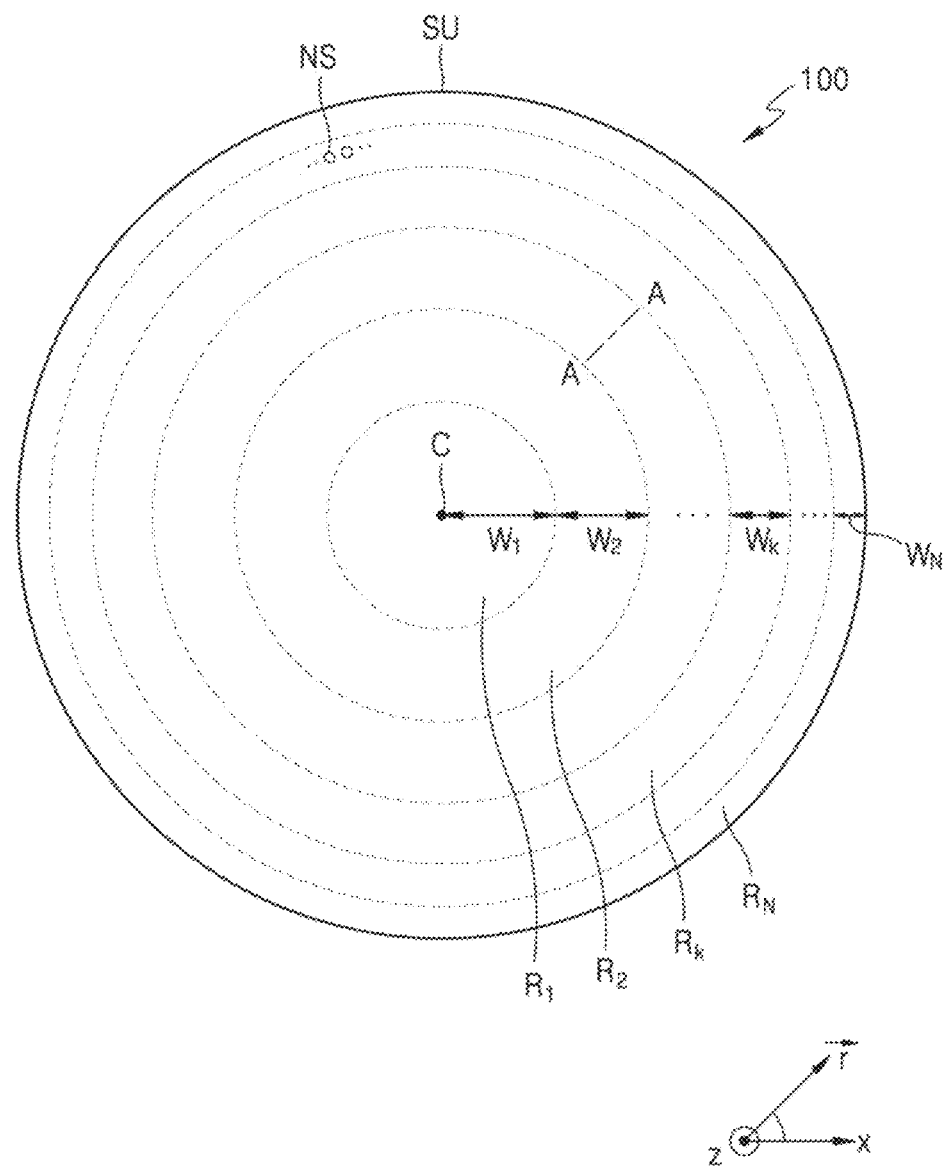
FIG. 7 is a plan view illustrating a schematic structure of a meta optical device according to an example embodiment.
Figure 8:
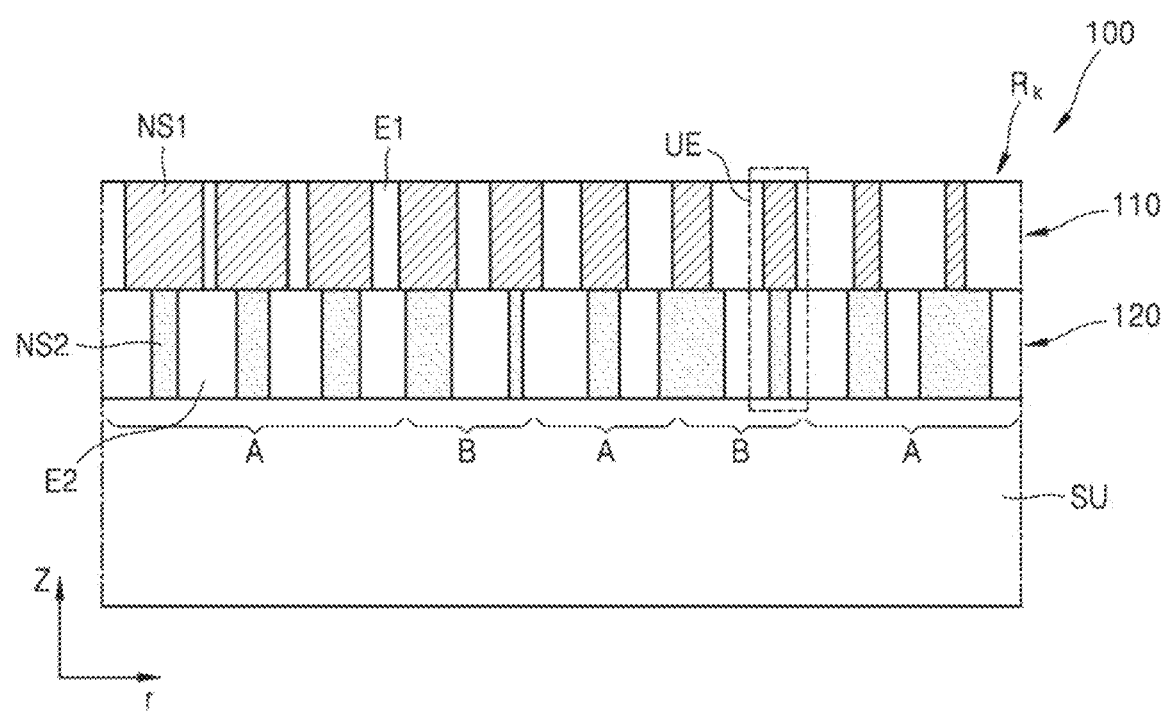
FIG. 8 is a cross-sectional view of the meta optical device taken along line A-A of FIG. 7.
Figure 9A:
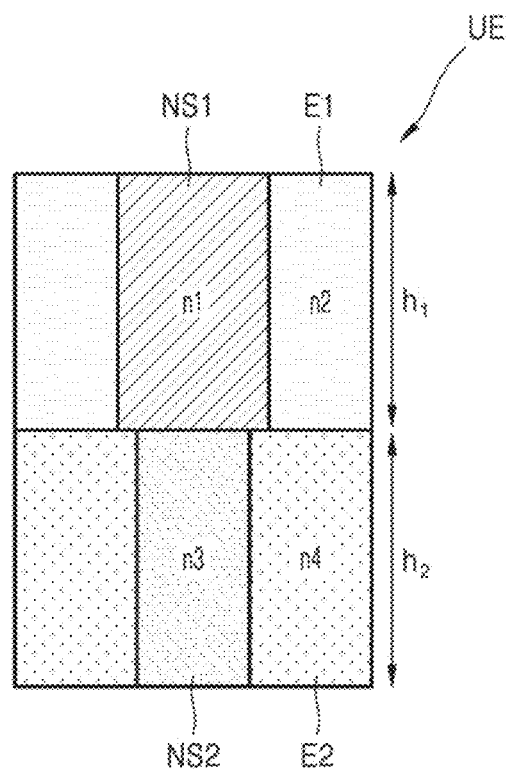
FIGS. 9A, 9B, and 9C are a cross-sectional view and plan views illustrating refractive indices and shape dimensions of a unit element illustrated in FIG. 8.
Figure 9B:
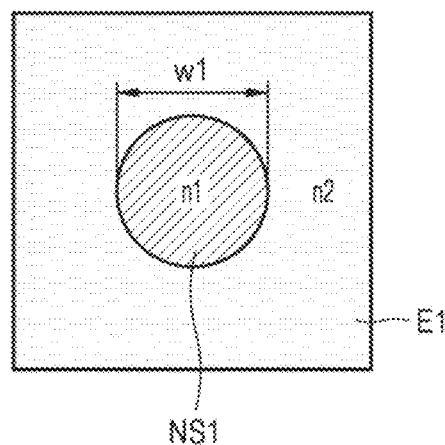
Figure 9C:
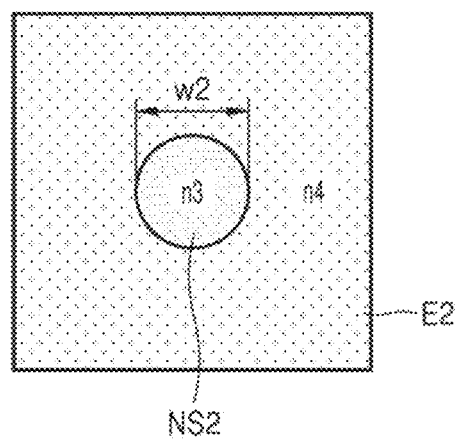

FIG. 7 is a plan view illustrating a schematic structure of a meta optical device according to an example embodiment, and FIG. 8 is a cross-sectional view of the meta optical device taken along line A-A of FIG. 7. FIGS. 9A to 9C are a cross-sectional view and plan views illustrating refractive indices and shape dimensions of a unit element illustrated in FIG. 8.

The meta optical device 100 includes a plurality of phase modulation regions $R_k$ set as described above, and includes a plurality of nanostructures NS for each phase modulation region $R_k$ to act as a lens. The phase modulation regions $R_k$ may be arranged in a radial direction r from a center C of the meta optical device 100, and the widths of the phase modulation regions $R_k$ may decrease as the distance from the center increases. The nanostructures NS may be arranged on a substrate SU. In FIG. 7, for example, only several nanostructures NS are illustrated, but embodiments are not limited thereto. As illustrated in FIG. 8, the nanostructures may be arranged in a two-layer structure. First nanostructures NS1 and a first surrounding material E1 surrounding the first nanostructures NS1 may be provided in a first layer 110, and second nanostructures NS2 and a second surrounding material E2 surrounding the second nanostructures NS2 may be provided in a second layer 120. The first nanostructure NS1 and the second nanostructure NS2 have a shape dimension of a sub-wavelength less than the operating wavelength of the meta optical device 100, that is, the shortest wavelength $\lambda 0$ among a plurality of wavelength bands apart from each other. The height of the first nanostructure NS1 and the second nanostructure NS2 may be greater than the operating wavelength of the meta optical device 100, that is, the shortest wavelength $\lambda 0$ among the wavelength bands apart from each other. The height range may be 0.5 times to 6 times the wavelength $\lambda 0$.

In the phase modulation regions $R_k$, the shapes, arrangements, and refractive indices of the first nanostructure NS1, the first surrounding material E1, the second nanostructure NS2, and the second surrounding material E2 are determined to implement the phase retardation profile and phase retardation dispersion shown in FIGS. 5 and 6.

Each of the phase modulation regions $R_k$ is a region showing a monotonous phase modulation pattern in a certain range. The phase modulation regions include a first region $R_1$, a second region $R_2$, ..., an N-th region $R_N$, which are sequentially arranged in the radial direction r from the center C of the meta optical device 100. As illustrated, the first region $R_1$ may be a circular region, and the second to N-th regions $R_2$ to $R_N$ may be an annular region. The first to N-th regions $R_1$ to $R_N$ are regions showing a phase retardation within a certain range. As illustrated in FIG. 5, the phase modulation ranges are different from each other for the plurality of wavelengths. The total number (N) of phase modulation regions and the widths $W_1, \ldots, W_k, \ldots, W_N$ of the phase modulation regions may be determined according to the refractive power (focal length) and the lens diameter, and may be set according to the process described with reference to FIGS. 3 to 6.

FIG. 8 illustrates a cross-sectional structure of a portion of the phase modulation region $R_k$. The first layer 110 includes the first nanostructures NS1 and the first surrounding material E1, and the second layer 120 includes the second nanostructures NS2 and the second surrounding material E2. The refractive indices, shapes, arrangements, and the like of the first nanostructure NS1, the first surrounding material E1, the second nanostructure NS2, and the second surrounding material E2 are set so that ratio of the effective refractive index dispersion to the effective refractive index change is different in the first layer 120 and the second layer 120.

The first nanostructure NS1 may include a material having a refractive index higher than a refractive index of the first surrounding material E1. This will be referred to as a nanopillar structure. The second nanostructure NS2 may include a material having a refractive index lower than a refractive index of the second surrounding material E2. This will be referred to as a nanohole structure. The meta optical device 100 may have a structure in which unit elements UE having a two-layer structure of a nanopillar structure and a nanohole structure are repeatedly arranged. In the case of the nanopillar structure, as the effective refractive index increases, the effective refractive index dispersion tends to increase together. For example, when a fill factor occupied by the first nanostructure NS1 in the unit element UE is increased to increase the effective refractive index, the effective refractive index dispersion also increases. In contrast, in the case of the nanohole structure, when a fill factor occupied by the second nanostructure NS2 in the unit element UE is decreased to increase the effective refractive index, the effective refractive index dispersion tends to slightly increase or decrease conversely, compared to the nanopillar structure. It may be seen that an effective refractive index dispersion change rate of the nanohole structure does not show a significant dependence on an effective refractive index change rate. This difference in dispersion characteristics between the nanopillar structure and the nanohole structure may be caused by the difference in the electric field focusing degree of the two structures. The meta optical device 100 according to the example embodiment uses the unit element UE in which the nanopillar structure and the nanohole structure, in which the effective refractive index dispersion change amount compared to the effective refractive index change amount is different, are stacked. A desired phase retardation and phase retardation dispersion may be achieved by adjusting detailed dimensions constituting the unit element UE according to a position.

The phase modulation region $R_k$ may include a region in which the width of the first nanostructures NS1 monotonically changes in one direction, for example, the radial direction r. The widths of the second nanostructures NS2 may change once or more times in one direction at radial positions in a region corresponding the region at which the widths of the first nanostructures NS1 change monotonously.

The phase modulation region $R_k$ may include a first zone A in which the sign of the effective refractive index change rates according to the position of the first layer 110 is equal to the sign of the effective refractive index change rates according to the position of the second layer 120, and a second zone B in which the sign of the effective refractive index change rates according to the position of the first layer is opposite to the sign of the effective refractive index change rates according to the sign of the second layer 120. The total area of the first zones A may be greater than the total area of the second zones B. For example, in the phase modulation region $R_k$, the region in which the signs of the effective refractive index change rates of the first layer 110 and the second layer 120 are equal to each other may be larger than the other region.

As illustrated in FIG. 8, in the first zone A, the width of the first nanostructure NS1 of the first layer 110 decreases in the radial direction r, that is, the effective refractive index decreases, and the width of the second nanostructure NS2 of the second layer 120 increases in the radial direction, that is, the effective refractive index decreases. In the second zone B, the width of the first nanostructure NS1 of the first layer 110 decreases in the radial direction r, that is, the effective refractive index decreases, and the width of the second nanostructure NS2 of the second layer 120 decreases in the radial direction, that is, the effective refractive index increases. One or more first zones A and one or more second zones B may be provided in each of the phase modulation regions $R_k$, and the first zones A and the second zones B may be alternately arranged.

However, the shapes and arrangements of the first nanostructures NS1 and the second nanostructures NS2 described herein are only examples that may implement the phase retardation and the phase retardation dispersion shown in FIGS. 5 and 6. The phase retardation and the phase retardation dispersion shown in FIGS. 5 and 6 may be implemented with other shapes and arrangements.

In the first layer 110 including the nanopillar structure, the effective refractive index change tendency and the dispersion change tendency for the effective refractive index change appear similarly. On the other hand, in the second layer 120, the relationship between the effective refractive index change tendency and the effective refractive index change is small, and thus, the first layer 110 may be a layer that mainly contributes to the phase retardation dispersion of the meta optical device 100. Both the phase retardation by the first layer 110 and the phase retardation by the second layer 120 contribute to the phase retardation of the meta optical device 100.

As illustrated in FIGS. 9A to 9C, the first nanostructure NS1 may have a cylindrical shape having a diameter w1 and a height h1, and the second nanostructure NS2 may have a cylindrical shape having a diameter w2 and a height h2. A refractive index n1 of the first nanostructure NS1 may be greater than a refractive index n2 of the first surrounding material E1, and a refractive index difference therebetween may be 0.2 or more or 0.5 or more. A refractive index n3 of the second nanostructure NS2 may be lower than a refractive index n4 of the second surrounding material E2, and a refractive index difference therebetween may be 0.2 or more or 0.5 or more.

A material having a high refractive index and a low absorbance in the operating wavelength band of the meta optical device 100 may be used for the first nanostructure NS1. For example, c-Si, p-Si, a-Si, a Group III-V compound semiconductor (gallium arsenide (GaAs), gallium phosphide (GaP), gallium nitride (GaN), etc.), silicon carbide (SiC), titanium oxide ($TiO_2$), titanium silicon oxide ($TiSiO_x$), silicon nitride ($Si_3N_4$), or silicon nitride (SiN) may be used for the first nanostructure NS1. The first surrounding material E1 may include a material having a relatively low refractive index and a low absorbance. Examples of the first surrounding material E1 may include a polymer material such as SU-8 or polymethylmethacrylate (PMMA), silicon oxide ($SiO_2$), SOG, or air.

A material having a low refractive index and a low absorbance in the operating wavelength band of the meta optical device 100 may be used for the second nanostructure NS2. Examples of the material may include a polymer material such as SU-8 or PMMA, $SiO_2$, SOG, or air. The second surrounding material E2 may include a material having a relatively high refractive index and a low absorbance. Example of the material may include c-Si, p-Si, a-Si, a Group III-V compound semiconductor (GaAs, GaP, GaN, GaAs, etc.), SiC, $TiO_2$, $TiSiO_x$, $Si_3N_4$, or SiN. The second nanostructure NS2 may have an empty hole shape surrounded by the second surrounding material E2.

The first nanostructure NS1 and the second nanostructure NS2 may have an aspect ratio greater than 1. The aspect ratio represents a height-to-diameter ratio. The aspect ratio may be 2 or more, 3 or more, 5 or more, or 10 or more, and may be 50 or less.

Although the first nanostructure NS1 and the second nanostructure NS2 are illustrated in a cylindrical shape, the first nanostructure NS1 and the second nanostructure NS2 are not limited thereto and may have various shapes such as, for example, a polygonal cylinder and an elliptical cylinder.

Figure 10A:
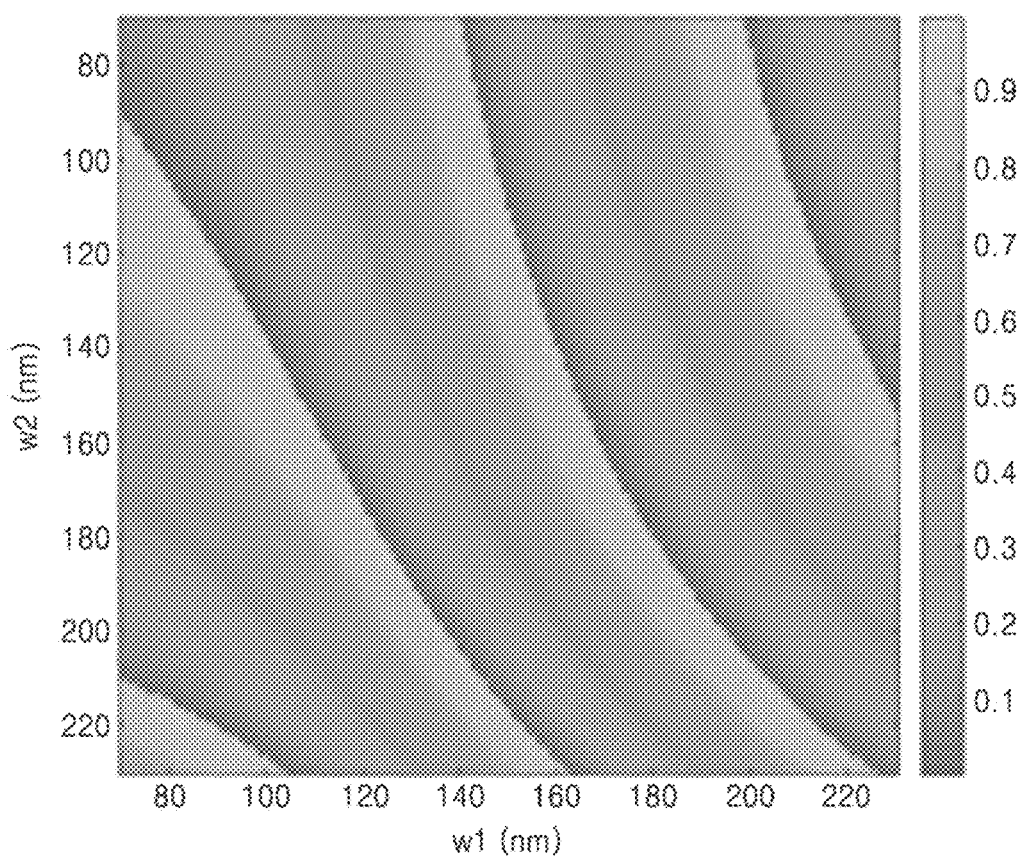
FIG. 10A is a distribution diagram showing a phase retardation by a unit element of a meta-optical device according to an example embodiment by computationally simulating it while changing a shape dimension of the unit element.
Figure 10B:
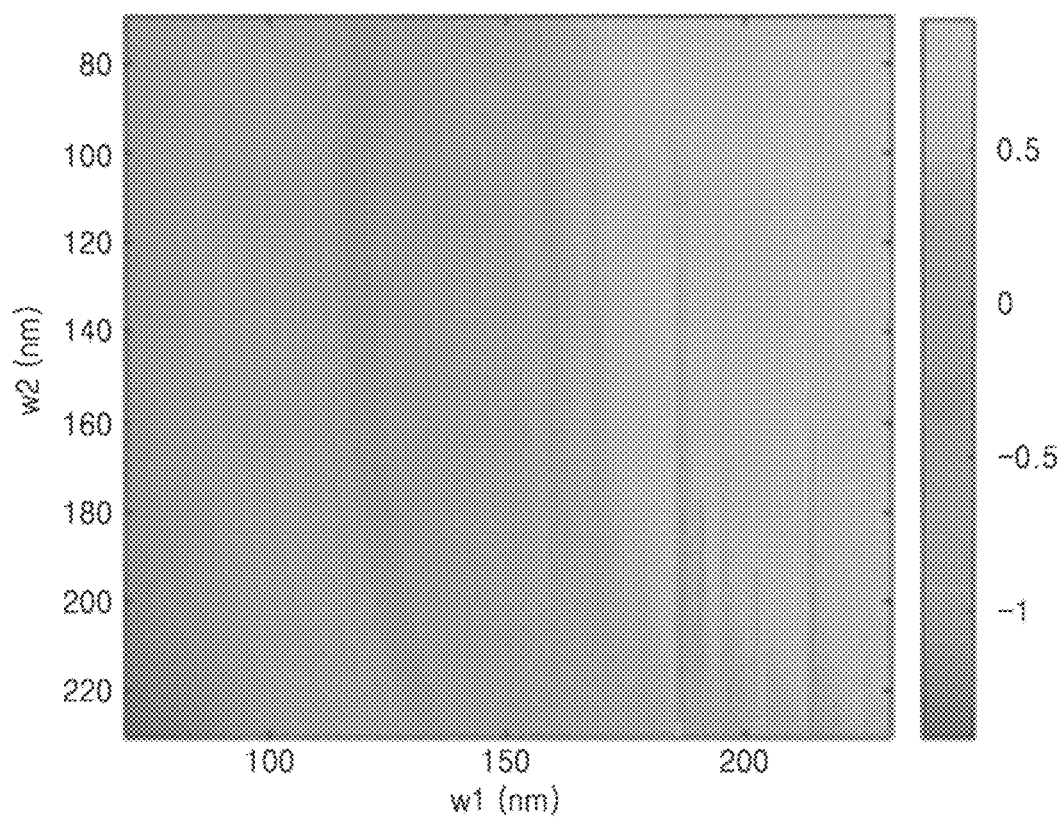
FIG. 10B is a distribution diagram showing a phase retardation dispersion by a unit element of a meta-optical device according to an example embodiment by computationally simulating it while changing a shape dimension of the unit element.
Figure 10C:
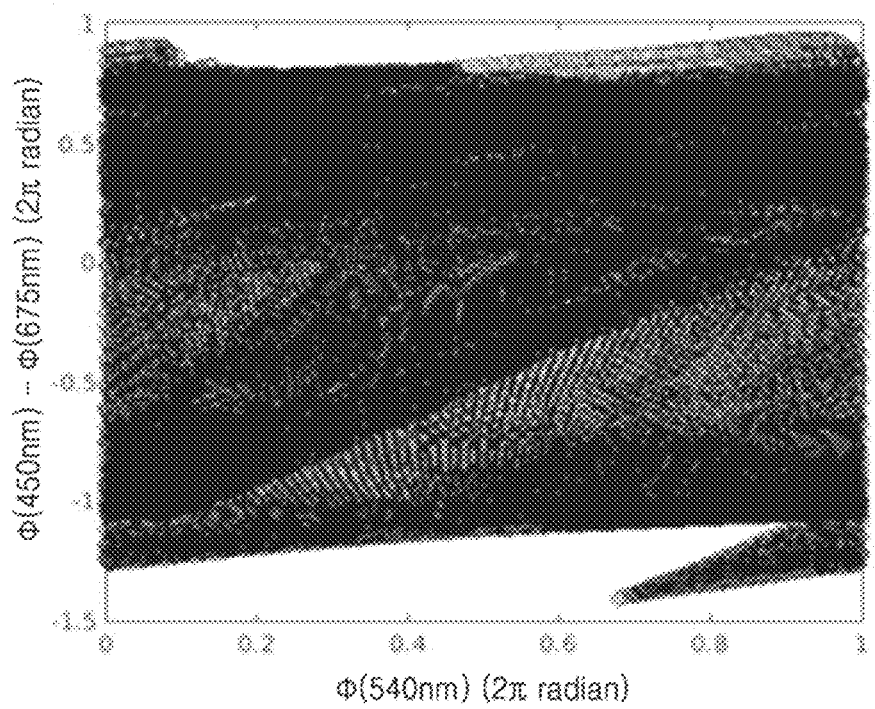
FIG. 10C is a distribution diagram in which various shape dimensions of a unit element of a meta optical device according to an example embodiment are mapped to a phase retardation-phase retardation dispersion plane.

FIGS. 10A to 10C show computer simulation results obtained when the shape dimensions of unit elements constituting the meta optical device according to the example embodiment are changed.

In the computer simulation, n1=2.5, n2=1.46, h1=2.0 μm, n3=1.0, n4=1.9, and h2=2.0 μm were set, w1 and w2 were changed, and phase retardation and phase retardation dispersion were calculated.

FIG. 10A is a distribution diagram showing a phase retardation by a unit element of a meta-optical device according to an example embodiment by computationally simulating it while changing a shape dimension of the unit element. The phase retardation is provided for light having a wavelength of 540 nm.

FIG. 10B is a distribution diagram showing a phase retardation dispersion by a unit element of a meta-optical device according to an example embodiment by computationally simulating it while changing a shape dimension of the unit element. The phase retardation dispersion represents the difference between the phase retardation for light having a wavelength of 450 nm and the phase retardation for light having a wavelength of 675 nm.

FIG. 10C is a distribution diagram in which various shape dimensions of a unit element of a meta optical device according to an embodiment are mapped to a phase retardation-phase retardation dispersion plane.

The horizontal axis of the graph represents φ(540 nm), and the vertical axis of the graph represents φ(450 nm)−φ(675 nm). In the graph plane of FIG. 10C, φ(540 nm) values ranging from 0 to $2\pi$ and φ(450 nm)−φ(675 nm) values ranging from $-2\pi$ to $2\pi$ are almost entirely mapped to the data set of w1 and w2. By using the data, unit elements capable of achieving the desired phase retardation and phase retardation dispersion may be arranged by position. In this case, a lens having almost no chromatic aberration for light having a wavelength of 450 nm, 540 nm, and 675 nm may be implemented.

Figure 11:
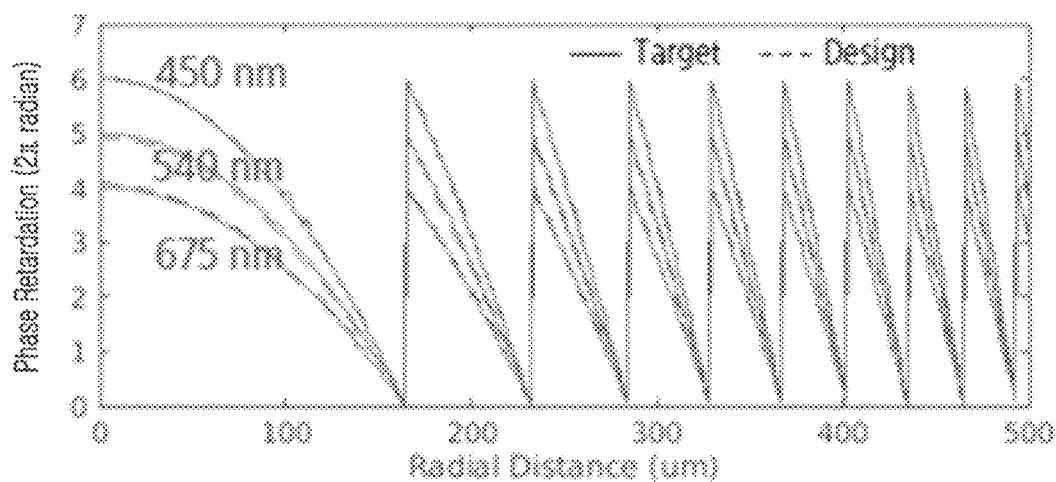
FIG. 11 is a graph showing a target phase retardation profile for each wavelength and a phase retardation profile designed based on a computer simulation result.
Figure 12:
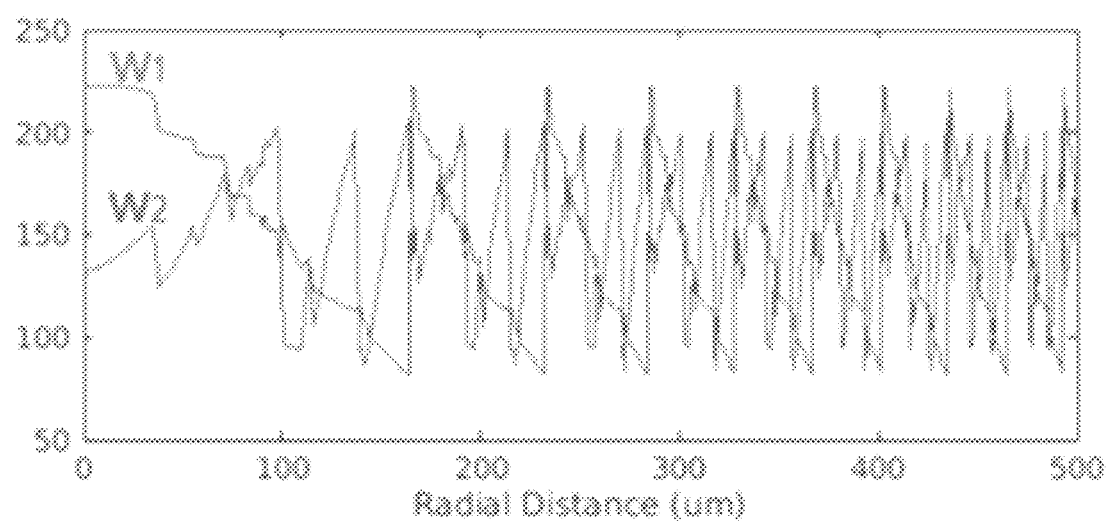
FIG. 12 is a graph showing shape dimensions of a unit element applied to a meta optical device according to an example embodiment for each position, based on a computer simulation result.

FIG. 11 is a graph showing a target phase retardation profile for each wavelength and a phase retardation profile designed based on a computer simulation result, and FIG. 12 is a graph showing shape dimensions of a unit element applied to a meta optical device according to an example embodiment for each position, based on a computer simulation result.

For example, w1 and w2 of the unit elements UE may be set as shown in FIG. 12 so that a target value indicated by a solid line in FIG. 11 is implemented, and the corresponding result is represented by a design value indicated by a dashed line. As shown in FIG. 11, the lines corresponding to target and design overlap each other to the extent that the lines are almost indistinguishable, and it may be seen that a meta optical device having desired performance may be obtained.

Figure 13:
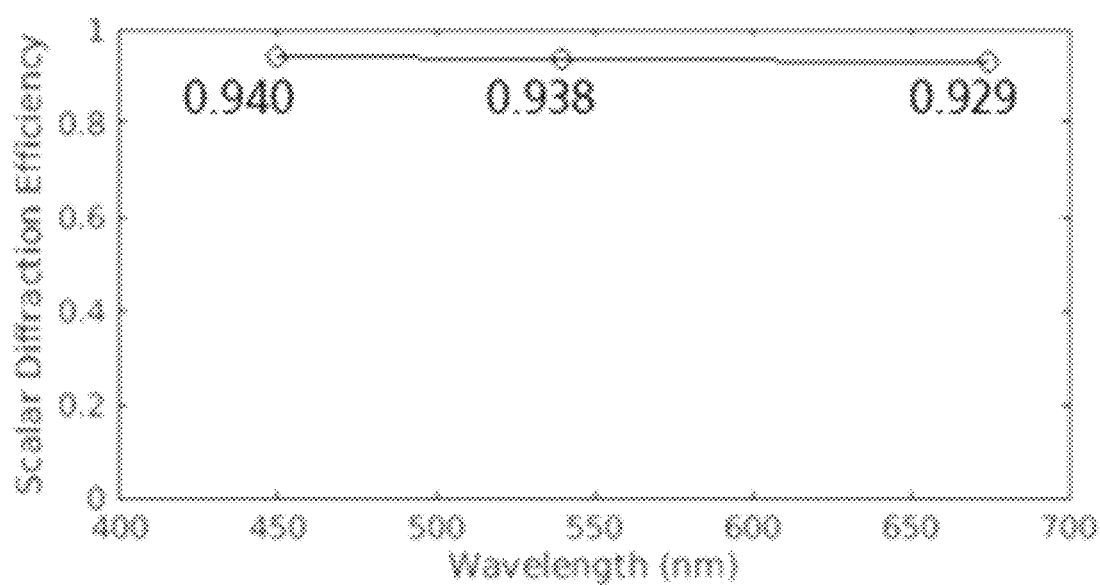
FIG. 13 is a graph showing diffraction efficiency of a meta optical device according to an example embodiment.

FIG. 13 is a graph showing diffraction efficiency of a meta optical device according to an example embodiment.

The diffraction efficiencies for pieces of light having three wavelengths of 450 nm, 540 nm, and 675 nm are shown as 0.94, 0.938, and 0,929, respectively. These values are the diffraction efficiencies of the achromatic meta lens, and evaluated as high values that have not been available in related art.

Figure 14:
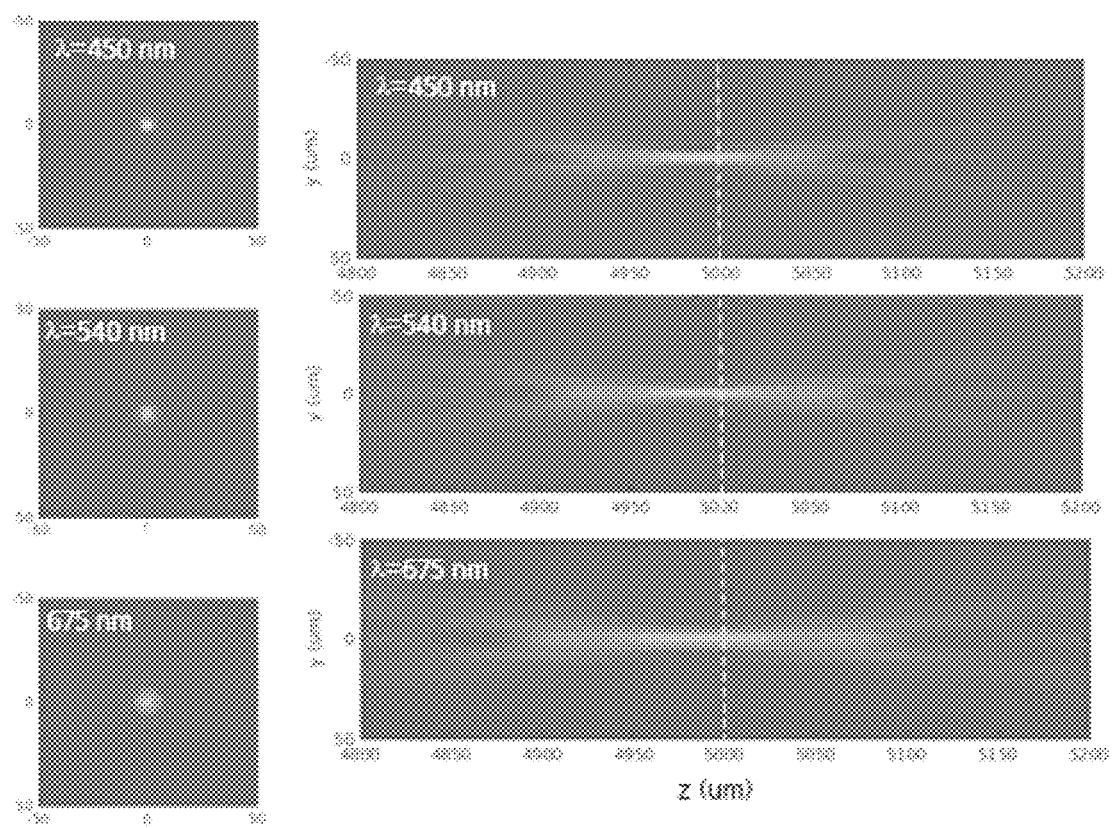
FIG. 14 is a computer simulation showing that a meta optical device according to an example embodiment has the same focal length for light having three different wavelengths.

FIG. 14 is a computer simulation showing that a meta optical device according to an example embodiment exhibits the same focal length with respect to pieces of light having three different wavelengths.

The focal lengths for pieces of light having wavelengths of 450 nm, 540 nm, and 675 nm are all shown as 5.0 mm, and the sizes of beam spots in a focal plane where z=5 mm are almost the same.

The shape of the unit element UE applied to the meta optical device 100 of FIG. 8 may be variously changed. The shape of the unit element UE is illustrated in the arrangement in which the centers of the first nanostructures NS1 and the second nanostructures NS2 of the first layer 110 and the second layer 120 are aligned, but this is illustrative and embodiments are not limited thereto. In the shape of the unit element UE, the central axes of the first nanostructure NS1 and the second nanostructure NS2 do not coincide with each other and may be misaligned at a certain interval, and this range is not limited. Not only the widths w1 and w2 of the first nanostructure NS1 and the second nanostructure NS2, but also the misalignment interval may be utilized as design variables. In addition, the heights of the first nanostructure NS1 and the second nanostructure NS2 may be used as design variables.

Figure 15A:
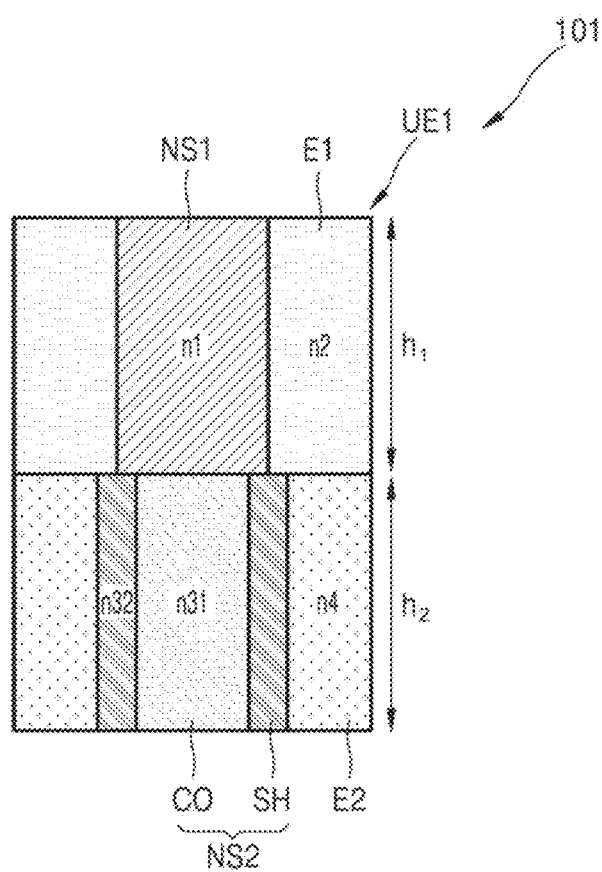
FIGS. 15A, 15B, and 15C are cross-sectional and plan views illustrating in detail a unit element applicable to a meta optical device according to another example embodiment.
Figure 15B:
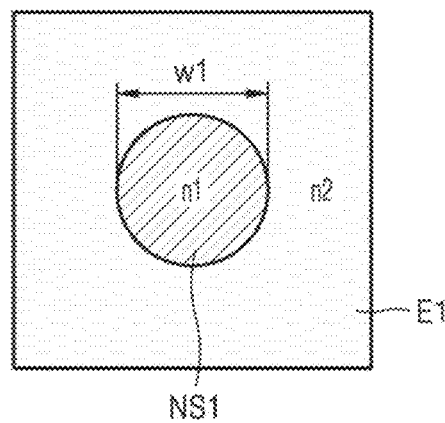
Figure 15C:
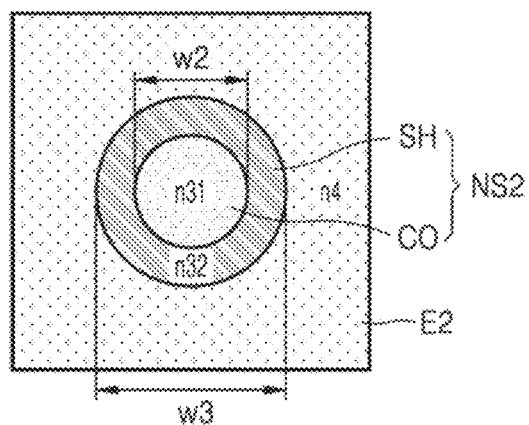

FIGS. 15A to 15C are cross-sectional and plan views illustrating in detail a unit element applicable to a meta optical device according to another example embodiment.

In the example embodiment, a second nanostructure NS2 of a unit element UE1 of a meta optical device 101 may have a shape including an inner pillar CO and a shell pillar SH surrounding and provided adjacent to the inner pillar CO. Such a structure may be employed as a structure similar to a nanohole structure having a relatively low dependence of a dispersion change rate on an effective refractive index change.

A refractive index n31 of the inner pillar CO may be less than a refractive index n4 of a second surrounding material E2, and a refractive index n32 of the shell pillar SH may be greater than the refractive index n31 of the inner pillar CO. The refractive index n32 of the shell pillar SH may be greater than or less than the refractive index n4 of the second surrounding material E2.

Figure 16:
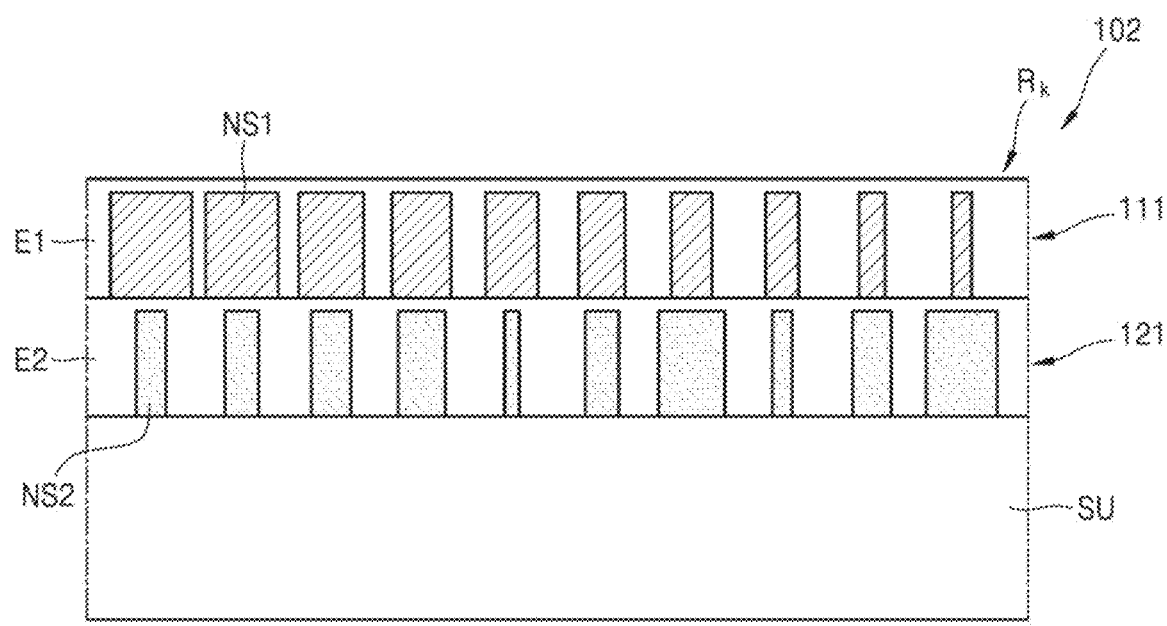
FIG. 16 is a cross-sectional view illustrating a schematic structure of a meta optical device according to another example embodiment.

FIG. 16 is a cross-sectional view illustrating a schematic structure of a meta optical device 102 according to another example embodiment.

The meta optical device 102 of the example embodiment differs from the meta optical device 100 of FIG. 8 in that a second surrounding material E2 in a second layer 121 is arranged to cover a side surface and an upper surface of a second nanostructure NS2, and a first surrounding material E1 in a first layer 111 is arranged to cover a side surface and an upper surface of a first nanostructure NS1. Such a structure may protect the first nanostructure NS1 and the second nanostructure NS2 and may be selected for ease of processing. Although FIG. 16 illustrates that a unit element has the same shape as that illustrated in FIG. 9A, embodiments are not limited thereto. The unit element may be changed to the shape illustrated in FIG. 15A.

In addition, unit elements constituting the meta optical device may be variously changed. The shapes of two unit elements UE and UE1 may be variously combined. For example, a nanopillar structure may be used in two layers and the refractive index difference may be set differently. According to another example embodiment, a nanohole structure may be used in two layers and the refractive index difference may be set differently. According to another example embodiment, a nanostructure having a shape including an inner pillar and a shell pillar may be applied to two layers and the refractive index difference may be set differently.

Figure 17:
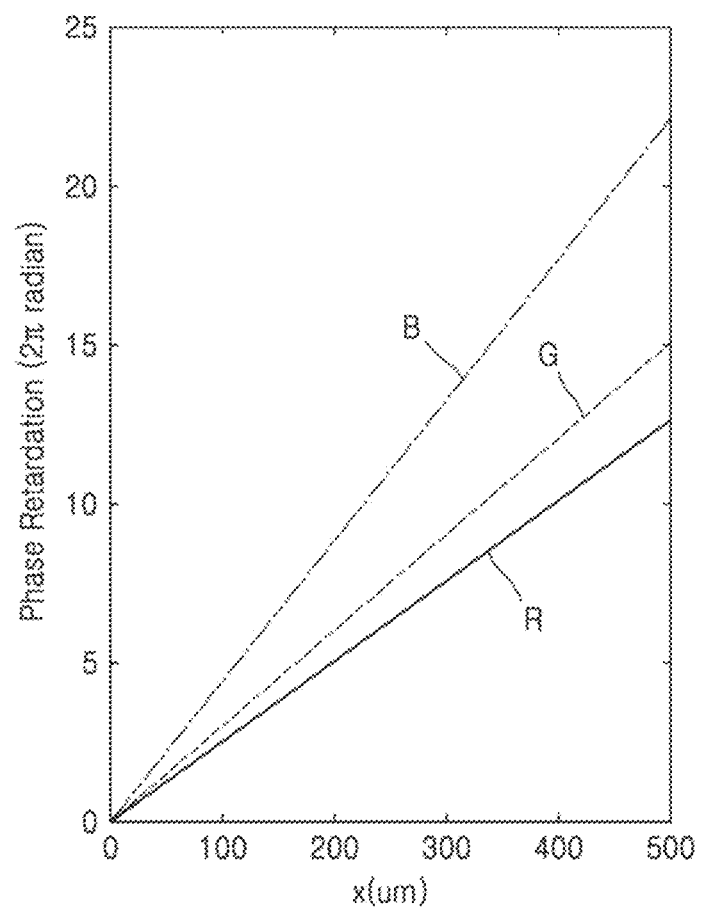
FIG. 17 shows a theoretical phase retardation profile showing achromatic beam deflection performance for R light, G light, and B light.

FIG. 17 shows a theoretical phase retardation profile for representing achromatic beam deflection performance for R light, G light, and B light.

Three phase retardation profiles are phase retardation profiles for R light, G light, and B light with respect to an achromatic beam deflector having a length of 500 μm and a diffraction angle of 1.0 degree (deg.). Such a theoretical phase retardation profile is difficult to implement in practice because different phase delay values have to be implemented for each position of the beam deflector. In addition, as the length of the beam deflector increases and the diffraction angle increases, the phase retardation value to be implemented increases proportionally. This causes the aspect ratio of the nanostructure to increase. Therefore, there is a limitation to the aspect ratio that is possible to manufacture.

From these phase retardation profiles, the phase retardation profile and the phase retardation distribution for each region, which are practically implementable, may be derived in a manner similar to that described with reference to FIGS. 2 to 6.

Figure 18:
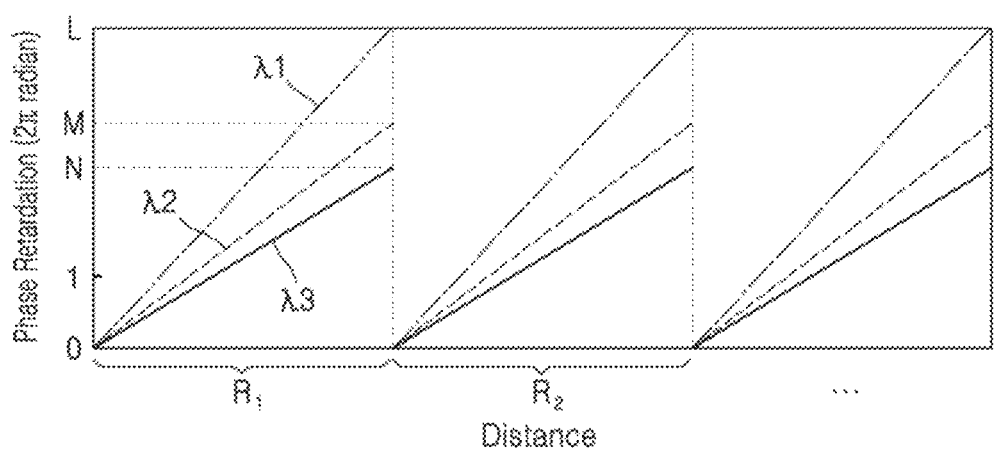
FIGS. 18 and 19 show a phase retardation profile and phase retardation dispersion of a meta optical device according to another example embodiment.
Figure 19:
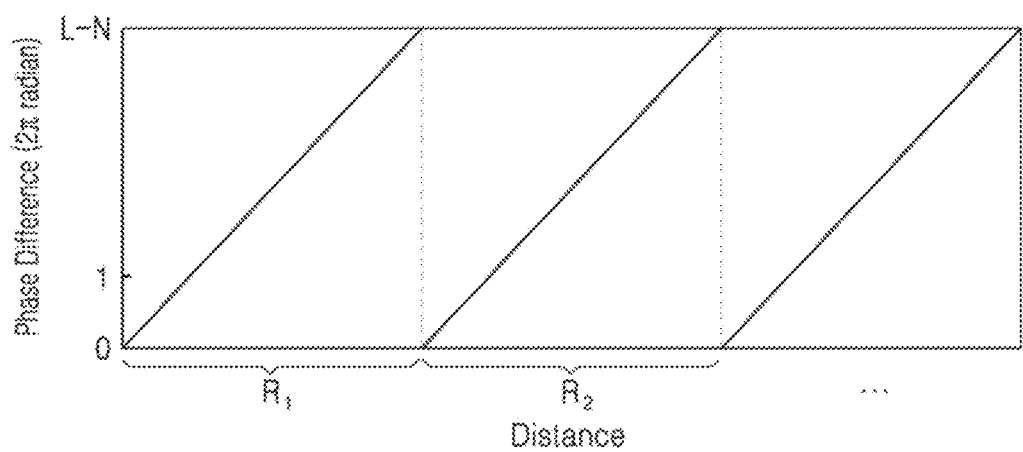

FIGS. 18 and 19 show a phase retardation profile and phase retardation dispersion of a meta optical device according to another example embodiment.

Phase retardation profiles that have different phase retardation ranges from each other for light in a plurality of wavelength bands and change linearly are shown in a plurality of phase modulation regions $R_1$, $R_2$, etc. For example, when the central wavelengths of the wavelength bands are $\lambda 1$, $\lambda 2$, and $\lambda 3$, the phase retardation profiles for light having wavelengths $\lambda 1$, $\lambda 2$, and $\lambda 3$ have phase modulation ranges of $2\pi*L$, $2\pi*M$, and $2\pi*N$ ($|L|\geq 1$, $|M|\geq 1$, $|N|\geq 1$, $L \neq M \neq N$). L, M, and N may be set to satisfy the condition of $L*\lambda 1 = M*\lambda 2 = N*\lambda 3$. When the reciprocal of the wavelengths may be expressed as an integer ratio. For example, when $1/\lambda 1 : 1/\lambda 2 : 1/\lambda 3$ is expressed as an integer ratio, L, M, and N are also integers. When $\lambda 1$, $\lambda 2$, and $\lambda 3$ are 450 nm, 540 nm, and 675 nm, respectively, L, M, and N are 6, 5, and 4, respectively.

When the meta optical device is implemented as a beam deflector, the slope of the phase retardation profile is constant, as illustrated in FIG. 17. Therefore, the widths of the phase modulation regions shown in the graphs of FIGS. 18 and 19 are constant.

The meta optical devices according to the example embodiment may exhibit achromatic optical performance for light having a plurality of certain narrow-band wavelengths, and may be applied to various electronic apparatuses that may utilize the meta optical devices.

Figure 20:
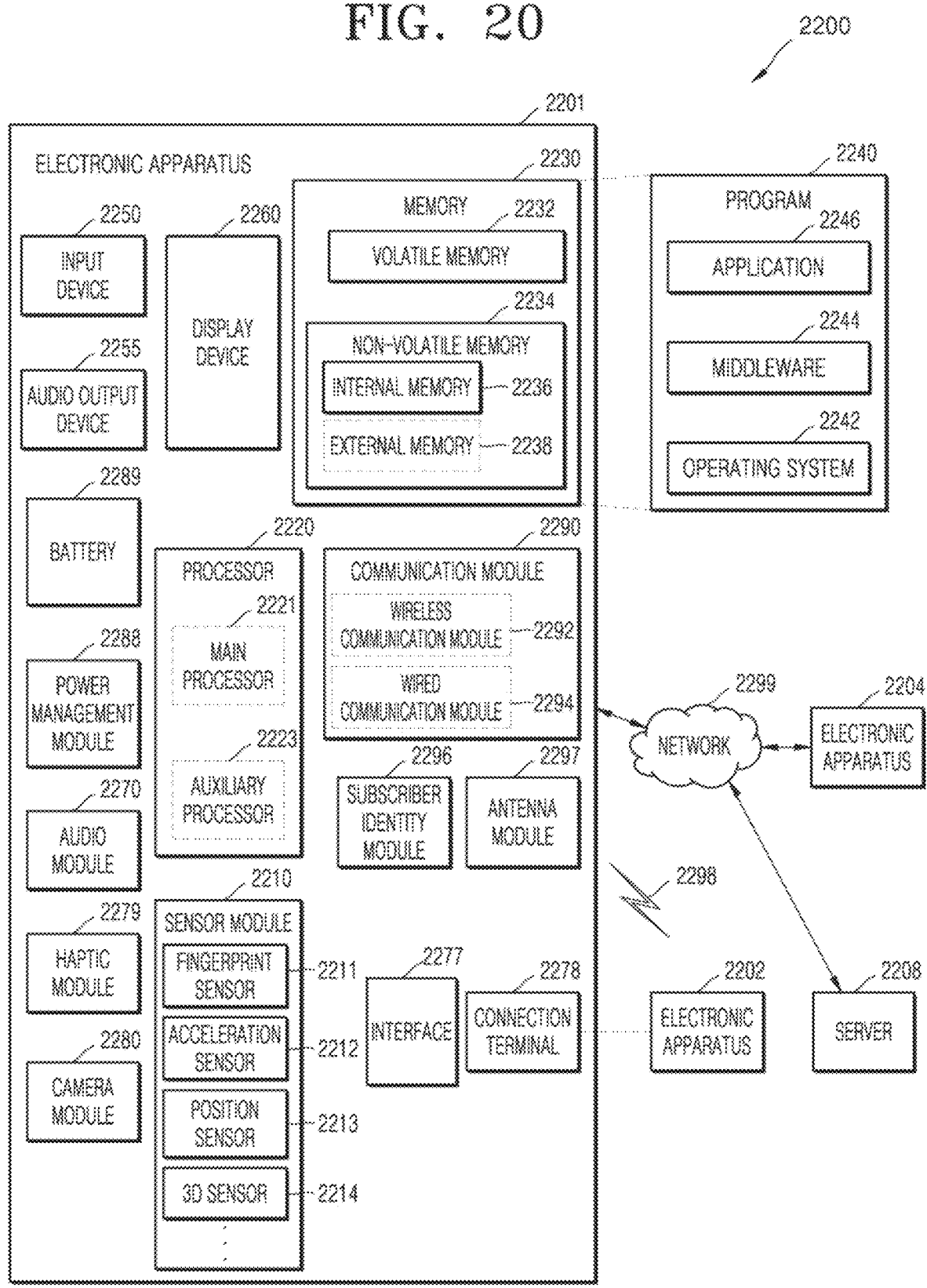
FIG. 20 is a block diagram illustrating a schematic configuration of an electronic apparatus according to an example embodiment.

FIG. 20 is a block diagram illustrating a schematic configuration of an electronic apparatus 2201 according to an example embodiment.

Referring to FIG. 20, in a network environment 2200, the electronic apparatus 2201 may communicate with another electronic apparatus 2202 via a first network 2298 (a short-range wireless communication network, etc.), or may communicate with another electronic apparatus 2204 and/or a server 2208 via a second network 2299 (a long-range wireless communication network, etc.). The electronic apparatus 2201 may communicate with the electronic apparatus 2204 through the server 2208. The electronic apparatus 2201 may include a processor 2220, a memory 2230, an input device 2250, an audio output device 2255, a display device 2260, an audio module 2270, a sensor module 2210, and an interface 2277, a haptic module 2279, a camera module 2280, a power management module 2288, a battery 2289, a communication module 2290, a subscriber identity module 2296, and/or an antenna module 2297. In the electronic apparatus 2201, some components (e.g., the display device 2260, etc.) may be omitted or other components may be added. Some components may be implemented as one integrated circuit. For example, a fingerprint sensor 2211, an iris sensor, an illumination sensor, etc. of the sensor module 2210 may be embedded in the display device 2260 (a display, etc.).

The processor 2220 may execute software (a program 2240, etc.) to control one or more other components (hardware and software components, etc.) of the electronic apparatus 2201 connected to the processor 2220, and may perform various data processing or operations. As part of data processing or operations, the processor 2220 may load commands and/or data received from other components (the sensor module 2210, the communication module 2290, etc.) into a volatile memory 2232, may process the commands and/or data stored in the volatile memory 2232, and may store result data in a non-volatile memory 2234. The processor 2220 may include a main processor 2221 (a central processing unit, an application processor, etc.) and an auxiliary processor 2223 capable of operating independently of or together with the main processor 2221 (a graphics processing unit, an image signal processor, a sensor hub processor, a communication processor, etc.). The auxiliary processor 2223 may use less power than the main processor 2221 and may perform a specialized function.

On behalf of the main processor 2221 while the main processor 2221 is in an inactive state (a sleep state), or together with the main processor 2221 while the main processor 2221 is in an active state (an application execution state), the auxiliary processor 2223 may control the functions and/or states related to some components of the electronic apparatus 2201 (the display device 2260, the sensor module 2210, the communication module 2290, etc.). The auxiliary processor 2223 (the image signal processor, the communication processor, etc.) may be implemented as part of other functionally related components (the camera module 2280, the communication module 2290, etc.).

The memory 2230 may store a variety of data required by the components of the electronic apparatus 2201 (the processor 2220, the sensor module 2276, etc.). The data may include, for example, the software (the program 2240, etc.) and input data and/or output data for commands related thereto. The memory 2230 may include the volatile memory 2232 and/or the non-volatile memory 2234.

The program 2240 may be stored in the memory 2230 as software, and may include an operating system 2242, middleware 2244, and/or an application 2246.

The input device 2250 may receive, from the outside (a user, etc.) of the electronic apparatus 2201, commands and/or data to be used by the components (the processor 2220, etc.) of the electronic apparatus 2201. The input device 2250 may include a microphone, a mouse, a keyboard, and/or a digital pen (a stylus pen, etc.).

The audio output device 2255 may output a sound signal to the outside of the electronic apparatus 2201. The audio output device 2255 may include a speaker and/or a receiver. The speaker may be used for general purposes such as multimedia playback or recording playback, and the receiver may be used to receive an incoming call. The receiver may be integrated as part of the speaker, or may be implemented as an independent separate device.

The display device 2260 may visually provide information to the outside of the electronic apparatus 2201. The display device 2260 may include a display, a hologram device, a projector, and a control circuit for controlling the same. The display device 2260 may include touch circuitry configured to sense a touch, and/or sensor circuitry (a pressure sensor, etc.) configured to measure the intensity of force generated by the touch.

The audio module 2270 may convert a sound into an electrical signal or vice versa. The audio module 2270 may obtain a sound through the input device 2250, or may output a sound through the audio output device 2255 and/or a speaker and/or a headphone of another electronic apparatus (the electronic apparatus 2202) directly or wirelessly connected to the electronic apparatus 2201.

The sensor module 2210 may sense an operating state (power, temperature, etc.) of the electronic apparatus 2201 or an external environmental state (a user state, etc.), and may generate an electrical signal and/or a data value corresponding to the sensed state. The sensor module 2210 may include the fingerprint sensor 2211, an acceleration sensor 2212, a position sensor 2213, a 3D sensor 2214, and the like. In addition, the sensor module 2210 may include an iris sensor, a gyro sensor, a barometric pressure sensor, a magnetic sensor, a grip sensor, a proximity sensor, a color sensor, an infrared (IR) sensor, a biometric sensor, a temperature sensor, a humidity sensor, and/or an illumination sensor.

The 3D sensor 2214 may sense the shape, movement, etc. of a subject by radiating certain light to the subject and analyzing light reflected from the subject. The 3D sensor 2214 may include the meta optical devices 100, 101, and 102 according to the embodiment or a structure modified therefrom. In the 3D sensor 2214, one or more meta optical devices may be provided as a lens, a beam deflector, a beam shaper, or the like. An exemplary structure of the 3D sensor 2214 will be described below with reference to FIG. 22.

The interface 2277 may support one or more designated protocols that may be used by the electronic apparatus 2201 so as to directly or wirelessly connect to another electronic apparatus (the electronic apparatus 2202, etc.). The interface 2277 may include a high definition multimedia interface (HDMI), a universal serial bus (USB) interface, a secure digital (SD) card interface, and/or an audio interface.

A connection terminal 2278 may include a connector through which the electronic apparatus 2201 may be physically connected to another electronic apparatus (the electronic apparatus 2202). The connection terminal 2278 may include an HDMI connector, a USB connector, an SD card connector, and/or an audio connector (a headphone connector, etc.).

The haptic module 2279 may convert an electrical signal into a mechanical stimulus (vibration, movement, etc.) or an electrical stimulus which a user may recognize through a tactile or kinesthetic sense. The haptic module 2279 may include a motor, a piezoelectric element, and/or an electrical stimulator.

The camera module 2280 may capture a still image and a moving image. The camera module 2280 may include a lens assembly including one or more lenses, image sensors, image signal processors, and/or flashes. The lens assembly included in the camera module 2280 may collect light emitted from a subject, an image of which is to be captured. The lens assembly may include the meta optical devices 100, 101, and 102 according to the embodiment or a structure modified therefrom. An exemplary structure of the camera module 2280 will be described below with reference to FIG. 21.

The power management module 2288 may manage power supplied to the electronic apparatus 2201. The power management module 2288 may be implemented as part of a power management integrated circuit (PMIC).

The battery 2289 may supply power to components of the electronic apparatus 2201. The battery 2289 may include a non-rechargeable primary cell, a rechargeable secondary cell, and/or a fuel cell.

The communication module 2290 may establish a direct (wired) communication channel and/or a wireless communication channel between the electronic apparatus 2201 and another electronic apparatus (the electronic apparatus 2202, the electronic apparatus 2204, the server 2208, etc.), and may support communication through the established communication channel. The communication module 2290 may include one or more communication processors that operate independently of the processor 2220 (the application processor, etc.) and support direct communication and/or wireless communication. The communication module 2290 may include a wireless communication module 2292 (a cellular communication module, a short-range wireless communication module, a global navigation satellite system (GNSS) communication module, etc.) and/or a wired communication module 2294 (a local area network (LAN) communication module, a power line communication module, etc.). The corresponding communication module among these communication modules may communicate with another electronic apparatus via the first network 2298 (a short-range communication network such as Bluetooth, WiFi Direct, or Infrared data association (IrDA)) or a second network 2299 (a long-range communication network such as a cellular network, the Internet, or a computer network (LAN, WAN, etc.)). These various types of communication modules may be integrated into one component (single chip, etc.), or may be implemented as a plurality of components (a plurality of chips) separate from each other. The wireless communication module 2292 may identify and authenticate the electronic apparatus 2201 within the communication network such as the first network 2298 and/or the second network 2299 by using subscriber information (international mobile subscriber identity (IMSI), etc.) stored in the subscriber identity module 2296.

The antenna module 2297 may transmit a signal and/or power to the outside (another electronic apparatus, etc.) or receive a signal and/or power from the outside. The antenna module 2297 may include a radiator having a conductive pattern on a substrate (a printed circuit board (PCB), etc.). The antenna module 2297 may include one or more antennas. When the antenna module 2297 includes a plurality of antennas, the communication module 2290 may select an antenna suitable for the communication method used in the communication network such as the first network 2298 and/or the second network 2299 among the antennas. A signal and/or power may be transmitted or received between the communication module 2290 and another electronic apparatus through the selected antenna. In addition to the antenna, other components (RFIC, etc.) may be included as part of the antenna module 2297.

Some components may be connected to each other through a communication method between peripheral devices (bus, general purpose input and output (GPIO)), serial peripheral interface (SPI), mobile industry processor interface (MIPI), etc.), and may exchange a signal (command, data, etc.) with each other.

The command or data may be transmitted or received between the electronic apparatus 2201 and the external electronic apparatus 2204 through the server 2108 connected to the second network 2299. The type of the electronic apparatuses 2202 and 2204 may be identical to or different from the type of the electronic apparatus 2201. All or part of the operations that are executed by the electronic apparatus 2201 may be executed by one or more of the electronic apparatuses 2202, 2204, and 2208. For example, when the electronic apparatus 2201 has to perform a certain function or service, the electronic apparatus 2201 may request one or more other electronic apparatuses to execute all or part of the function or service, instead of executing the function or service by itself. The one or more other electronic apparatuses receiving the request may execute an additional function or service related to the request, and may transmit a result of the executing to the electronic apparatus 2201. For this purpose, cloud computing, distributed computing, and/or client-server computing technologies may be used.

Figure 21:
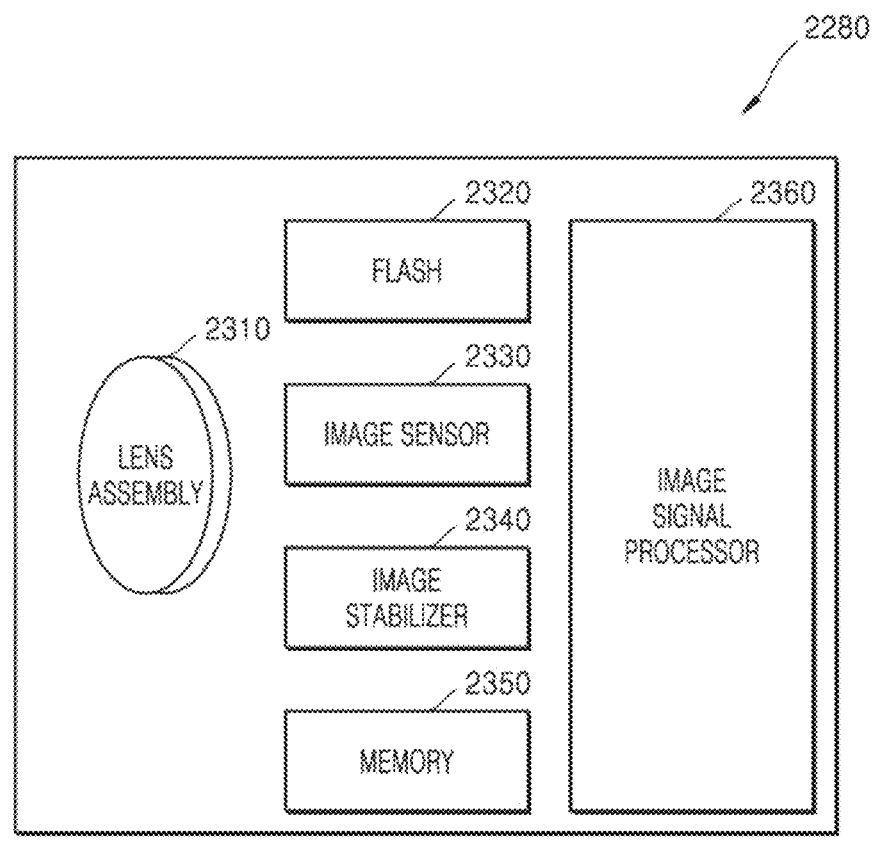
FIG. 21 is a block diagram illustrating a schematic configuration of a camera module included in the electronic apparatus of FIG. 20.

FIG. 21 is a block diagram illustrating a schematic configuration of the camera module included in the electronic apparatus of FIG. 20.

Referring to FIG. 21, the camera module 2280 may include a lens assembly 2310, a flash 2320, an image sensor 2330, an image stabilizer 2340, a memory 2350 (a buffer memory, etc.), and/or an image signal processor 2360. The lens assembly 2310 may collect light emitted from a subject, an image of which is to be captured, and may include the meta optical device 100 described above or a meta optical device having a structure modified therefrom. The lens assembly 2310 may include one or more meta lenses. The meta lens provided in the lens assembly 2310 may have the meta optical devices 100, 101, and 102 described above, a combination thereof, or a modification thereof. The meta lens provided in the lens assembly 2310 may exhibit substantially achromatic lens performance for light having a plurality of narrow-band wavelengths apart from each other. A plurality of meta lenses having different focal lengths, effective diameters, and the like may be provided. The lens assembly 2310 may use a refractive lens and a meta lens together so as to obtain desired imaging performance. The lens assembly 2310 including the meta optical device may implement desired optical performance and have a short optical overall length.

The camera module 2280 may further include an actuator. For example, the actuator may drive positions of lens elements constituting the lens assembly 2310 for zooming and/or autofocus (AF), and may adjust a separation distance between the lens elements.

The camera module 2280 may include a plurality of lens assemblies 2310. In this case, the camera module 2280 may be a dual camera, a 360-degree camera, or a spherical camera. Some lens assemblies 2310 may have the same lens properties (angle of view, focal length, autofocus, F number, optical zoom, etc.), or may have different lens properties. The lens assembly 2310 may include a wide-angle lens or a telephoto lens.

The flash 2320 may emit light used to enhance light emitted or reflected from the subject. The flash 2320 may include one or more light-emitting diodes (a red-green-blue (RGB) LED, a white LED, an infrared LED, an ultraviolet LED, etc.) and/or a xenon lamp. The flash 2320 may be configured to provide light having a plurality of different wavelengths from each other. For example, the flash 2320 may provide light having a narrow-band wavelength at which the meta optical device included in the lens assembly 2310 exhibits achromatic lens performance. The image sensor 2330 may obtain an image corresponding to the subject by converting light, which is emitted or reflected from the subject and transmitted through the lens assembly 2310, into an electrical signal. The image sensor 2330 may include one or more sensors selected from image sensors having different properties, such as an RGB sensor, a black and white (BW) sensor, an IR sensor, and a UV sensor. Each of the sensors included in the image sensor 2330 may be implemented as a charged coupled device (CCD) sensor and/or a complementary metal oxide semiconductor (CMOS) sensor.

In response to the movement of the camera module 2280 or an electronic apparatus 2301 including the same, the image stabilizer 2340 may move one or more lenses included in the lens assembly 2310 or the image sensor 2330 in a specific direction, or may control operating characteristics of the image sensor 2330 (adjust a read-out timing, etc.) so as to compensate for a negative effect due to movement. The image stabilizer 2340 may sense the movement of the camera module 2280 or the electronic apparatus 2301 by using a gyro sensor (not illustrated) or an acceleration sensor (not illustrated) arranged inside or outside the camera module 2280. The image stabilizer 2340 may be implemented in an optical manner.

The memory 2350 may store partial or entire data of an image obtained through the image sensor 2330 for subsequent image processing. For example, when a plurality of images are obtained at a high speed, the obtained original data (Bayer-patterned data, high-resolution data, etc.) is stored in the memory 2350, and only low-resolution images are displayed. After that, the original data of the selected image (image selected by a user, etc.) may be transmitted to the image signal processor 2360. The memory 2350 may be integrated into the memory 2230 of the electronic apparatus 2201, or may be configured as a separate memory that operates independently.

The image signal processor 2360 may perform at least one image processing on the image obtained through the image sensor 2330 or the image data stored in the memory 2350. The at least one image processing may include depth map generation, three-dimensional (3D) modeling, panorama generation, feature point extraction, image synthesis, and/or image compensation (noise reduction, resolution adjustment, brightness adjustment, blurring, sharpening, softening, etc.). The image signal processor 2360 may perform control (exposure time control, read-out timing control, etc.) on components (the image sensor 2330, etc.) included in the camera module 2280. The image processed by the image signal processor 2360 may be stored again in the memory 2350 for additional processing, or may be provided to external components of the camera module 2280 (the memory 2230, the display device 2260, the electronic apparatus 2202, the electronic apparatus 2204, the server 2208, etc.). The image signal processor 2360 may be integrated into the processor 2220, or may be configured as a separate processor that operates independently of the processor 2220. When the image signal processor 2360 is configured as a processor separate from the processor 2360, the image processed by the image signal processor 2360 may be displayed on the display device 2260 after the processor 2220 performs additional image processing thereon.

The electronic apparatus 2201 may include a plurality of camera modules 2280 each having different properties or functions from each other. In this case, one of the camera modules 2280 may be a wide-angle camera, and another may be a telephoto camera. Similarly, one of the camera modules 2280 may be a front camera, and another may be a rear camera.

Figure 22:
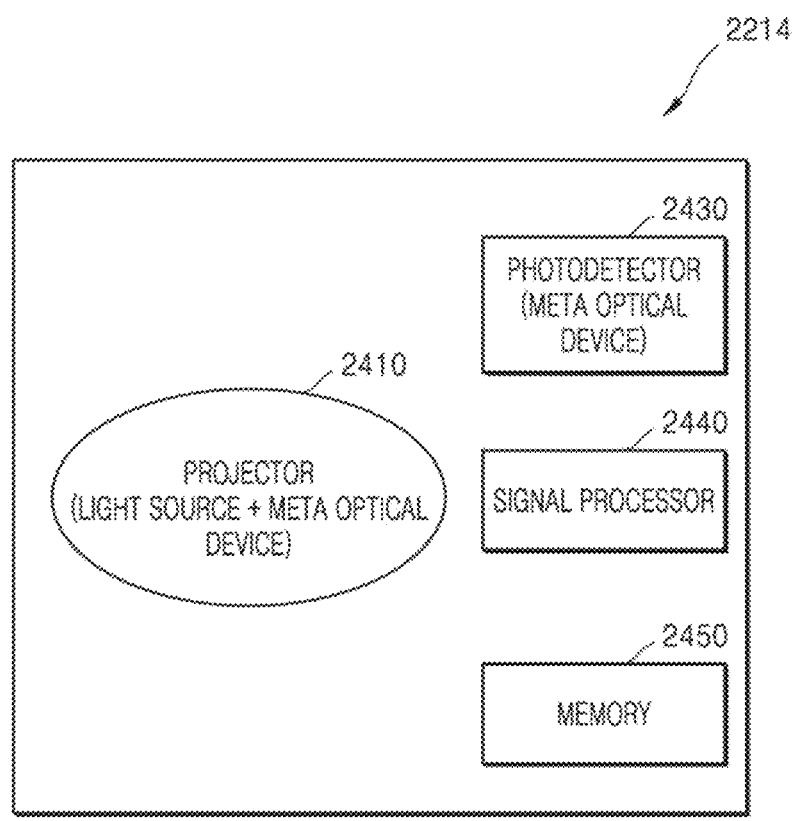
FIG. 22 is a block diagram illustrating a schematic configuration of a three-dimensional (3D) sensor included in the electronic apparatus of FIG. 20.

FIG. 22 is a block diagram illustrating a schematic configuration of the 3D sensor 2214 included in the electronic apparatus 2201 of FIG. 20.

The 3D sensor 2214 senses the shape, movement, etc. of the subject by radiating certain light to the subject and receiving and analyzing light reflected from the subject. The 3D sensor 2214 includes a projector 2410, a photodetector 2430, a signal processor 2440, and a memory 2450. The projector 2410 may include a light source and a meta optical device. As the meta optical device, one of the meta optical devices 100, 101, and 102 according to the example embodiments, a combination thereof, and a modified structure thereof may be employed. The projector 2410 may include one or more meta optical devices acting as a lens, a beam deflector, or a beam shaper.

The projector 2410 radiates light to be used to analyze the shape or position of the subject. The projector 2410 may include a light source that generates and radiates light having a certain wavelength. The light source may include as a laser diode (LD), an LED, or a super luminescent diode (SLD), which generates and radiates light in a wavelength band suitable for analyzing the position and shape of an object, for example, light in an infrared wavelength band. The light source may be a tunable laser diode. The light source may generate and radiate light in a plurality of different wavelength bands from each other. The light having different wavelengths from each other may have a narrow band, for example, a bandwidth of 10 nm or less or 5 nm or less. The light source may generate and radiate pulsed light or continuous light.

The meta optical device provided in the projector 2410 modulates the light emitted from the light source and transmits the modulated light to the subject. When the meta optical device is a beam deflector, the meta optical device may deflect incident light in a certain direction so that the light is directed toward the subject. When the meta optical device is a beam shaper, the meta optical device modulates incident light so that the incident light has a distribution having a certain pattern. The meta optical device may form structured light suitable for 3D shape analysis. The meta optical device may include one or more lenses. In this case, the meta optical device may collect or collimate light emitted from the light source.

As described above, the meta optical device may perform achromatic light modulation on light having a plurality of certain narrow-band wavelengths.

The photodetector 2430 receives reflected light of the light that the projector 2410 radiates to the subject. The photodetector 2430 may include an array of a plurality of sensors that sense light, or may include only one sensor. The photodetector 2430 may include a meta optical device. The meta optical device included in the photodetector 2430 may be a lens that collects light on a sensor.

The signal processor 2440 may process a signal sensed by the photodetector 2430 and analyze the shape of the subject, etc. The signal processor 2440 may analyze a 3D shape including a depth position of the subject.

For the 3D shape analysis, an operation for light time-of-flight measurement may be performed. Various arithmetic methods may be used for light time-of-flight measurement. For example, in the case of a direct time measurement method, pulsed light is projected onto a subject, and a distance is calculated by using a timer to measure the return time of light reflected from the subject. In the case of a correlation method, pulsed light is projected onto a subject, and a distance is measured from brightness of light reflected from the subject. In the case of a phase retardation measurement method, continuous wave light such as a sine wave is projected onto a subject, and a phase difference from reflected light is detected and converted into a distance.

When the structured light is radiated to the subject, the depth position of the subject may be calculated from a change in the pattern of the structured light reflected from the subject, that is, a result of comparison with the incident structured light pattern. Depth information of the subject may be extracted by tracking the pattern change for each coordinate of the structured light reflected from the subject, and 3D information related to the shape and movement of the subject may be extracted therefrom.

The memory 2450 may store programs and other data necessary for the operations of the signal processor 2440.

The operation result of the signal processor 2440, that is, information about the shape and position of the subject may be transmitted to another unit of the electronic apparatus 2201 or another electronic apparatus. For example, the information may be used by the application 2246 stored in the memory 2230. Another electronic apparatus to which the result is transmitted may be a display device or a printer that outputs the result. In addition, another electronic apparatus may be an autonomous driving device (an unmanned vehicle, an autonomous vehicle, a robot, a drone, etc.), a smart phone, a smart watch, a mobile phone, a personal digital assistant (PDA), a laptop, a personal computer (PC), various wearable devices, other mobile or non-mobile computing devices, and an internet of things (IoT) device, but is not limited thereto.

Figure 23:
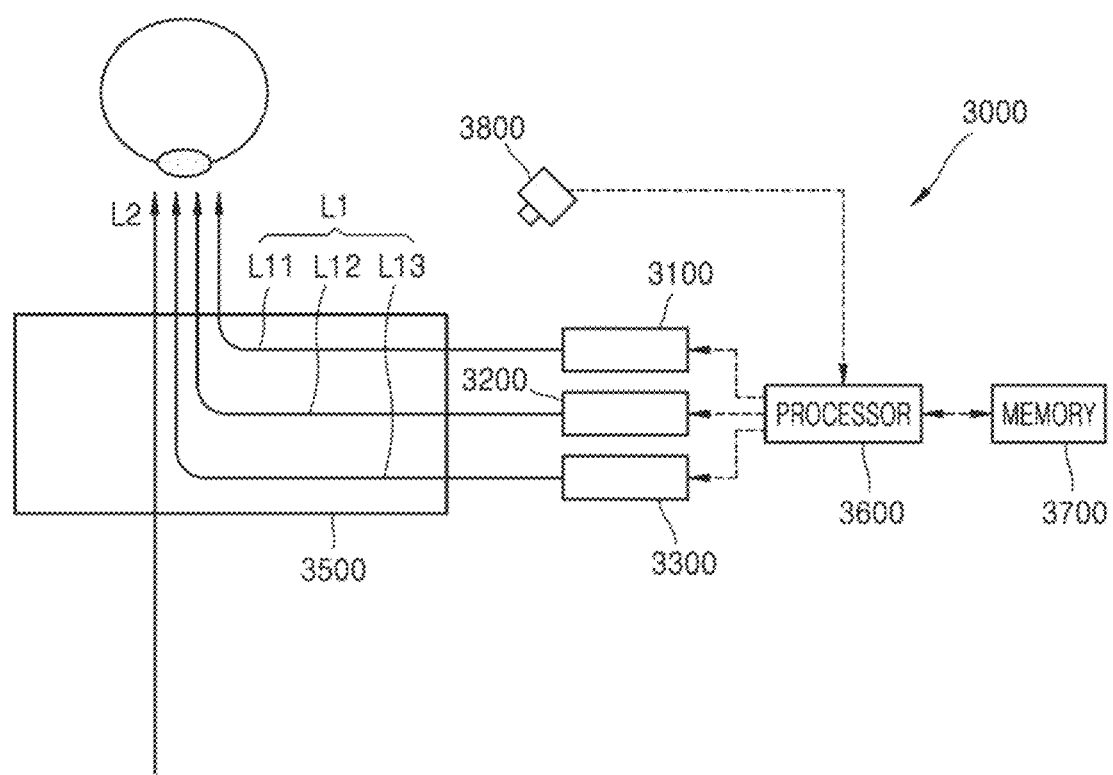
FIG. 23 is a conceptual diagram illustrating a schematic configuration of an augmented reality apparatus according to an example embodiment.

FIG. 23 is a conceptual diagram illustrating a schematic configuration of an augmented reality apparatus 3000 according to an example embodiment.

The augmented reality apparatus 3000 includes a first image projector 3100, a second image projector 3200, and a third image projector 3300, which provide images, and also includes a light transmitter 3500 that transmits image light L1 from the first, second, and third image projectors 3100, 3200, and 3300 to a user's field of view. The augmented reality apparatus 3000 also includes a processor 3600 that controls the overall configuration of the augmented reality apparatus 3000, and a memory 3700 in which codes of programs to be executed by the processor 3600, other data, and the like are stored. The augmented reality apparatus 3000 may also include a sensor 3800 that recognizes a user environment.

Each of the first image projector 3100, the second image projector 3200, and the third image projector 3300 includes an image former and a meta optical device, and the image light L1 is formed by pieces of light L11, L12, and L13 in different wavelength bands from each other.

The type of images formed by the first image projector 3100, the second image projector 3200, and the third image projector 3300 is not particularly limited, and may be, for example, a two-dimensional (2D) image or a 3D image. The 3D image may include, for example, a stereo image, a hologram image, a light field image, or an integral photography (IP) image. Also, the 3D image may include a multi-view or super multi-view image.

The image formers provided in the first image projector 3100, the second image projector 3200, and the third image projector 3300 may include, for example, a liquid crystal on silicon (LCoS) device, a liquid crystal display (LCD) device, an organic light-emitting diode (OLED) display device, and a digital micromirror device (DMD), may also include a next-generation display device such as a micro LED and a quantum dot (QD) LED. When the display device provided in the image former is a non-emission type device such as an LCD, the image former may further include a light source that provides light for image formation.

The pieces of light L11, L12, and L13 in different wavelength bands from each other, which are provided by the first image projector 3100, the second image projector 3200, and the third image projector 3300 may have a narrow band, for example, a bandwidth of 10 nm or less or 5 nm or less, and the bandwidth may be a narrow-band wavelength included in R, G, and B wavelength bands. The central wavelengths of each narrow-band may be 675 nm, 540 nm, and 450 nm.

The meta optical devices provided in the first image projector 3100, the second image projector 3200, and the third image projector 3300 may include the meta optical devices 100, 101, and 102 according to the example embodiment or a structure modified therefrom, and may be a lens that exhibits achromatic performance for light having a plurality of narrow-band wavelengths. In this case, the meta optical devices provided in the first image projector 3100, the second image projector 3200, and the third image projector 3300 may have the same structure, and may operate with the same performance for the pieces of light having different narrow-band wavelengths from each other.

The light transmitter 3500 may change paths of the pieces of light L11, L12, and L13 in different wavelength bands from each other, which are provided by the first image projector 3100, the second image projector 3200, and the third image projector 3300, and transmit the pieces of light L11, L12, and L13 to an observer's field of view. The light transmitter 3500 may include a meta optical device that acts as a beam deflector. The meta optical device provided in the light transmitter 3500 may include the meta optical devices 100, 101, and 102 according to the example embodiment or a structure modified therefrom, and may exhibit achromatic beam deflection performance for light having the narrow-band wavelengths.

The light transmitter 3500 may also be referred to as an optical combiner in that the light transmitter 350 transmits ambient light L2 in front of the observer to the observer's field of view.

The first image projector 3100, the second image projector 3200, and the third image projector 3300 may be controlled by the processor 3600 so that the image light L1 includes additional information corresponding to the user environment. For example, the user environment is recognized by the sensor 3800, and additional information images suitable therefor may be formed by the first, second, and third image projectors 3100, 3200, and 3300, considering the recognition result.

The meta optical device may exhibit substantially achromatic optical performance for light having narrow-band wavelengths.

The meta optical device has a structure in which the phase retardation and the phase retardation dispersion are independently controlled to a desired form by using the arrangement of multi-layered nanostructures, and may exhibit high diffraction efficiency for light having narrow-band wavelengths.

The meta optical device may be utilized as a lens, a beam deflector, a beam shaper, and the like, and may be employed in various electronic apparatuses using the same.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. A meta optical device comprising:
   a plurality of phase modulation regions respectively comprising a plurality of nanostructures and configured to modulate a phase of incident light, wherein a phase retardation profile of the plurality of phase modulation regions monotonically changes with respect to light of a plurality of wavelength bands apart from each other,
   wherein phase modulation ranges with respect to the light of the plurality of wavelength bands are different from each other, and
   wherein, in each of the plurality of phase modulation regions, a phase retardation dispersion defined by a difference between a phase retardation profile corresponding to light of a first wavelength band among the plurality of wavelength bands and a phase retardation profile corresponding to light of a second wavelength band among the plurality of wavelength bands monotonically changes with a certain amount of change, the first wavelength band being longer than the second wavelength band.

2. The meta optical device of claim 1, wherein the plurality of wavelength bands are included in a red wavelength band, a green wavelength band, and a blue wavelength band, and
   wherein a bandwidth of each of the plurality of wavelength bands is less than or equal to 50 nm.

3. The meta optical device of claim 1, wherein each of the plurality of phase modulation regions has a phase modulation range of $2\times*k$, where $|k|>1$, with respect to the light of the plurality of wavelength bands, and
   wherein a phase modulation range corresponding to light of the first wavelength band among the plurality of wavelength bands is less than a phase modulation range corresponding to light of the second wavelength band among the plurality of wavelength bands, the first wavelength band being longer than the second wavelength band.

4. The meta optical device of claim 1, wherein each of the plurality of phase modulation regions has a phase modulation range of $2\pi*L$, $2\pi*M$, and $2\pi*N$, where $|L|\geq 1$, $|M|\geq 1$, $|N|\geq 1$, $L \neq M \neq N$, with respect to the light of the plurality of wavelength bands, and when central wavelengths of the plurality of wavelength bands are 21, 22, and 23, $L*\lambda 1=M*\lambda 2=N*\lambda 3$ is satisfied.

5. The meta optical device of claim 1, wherein each of the plurality of phase modulation regions comprises:
a first layer comprising a plurality of first nanostructures and a first surrounding material provided adjacent to the plurality of first nanostructures;
a second layer provided on the first layer and comprising a plurality of second nanostructures and a second surrounding material provided adjacent to the plurality of second nanostructures; and
a first zone in which sign of effective refractive index change rates corresponding to a position of the first layer is equal to the sign of the effective refractive index change rates according to the position of the second layer, and a second zone in which the sign of the effective refractive index change rates corresponding to the position of the first layer is opposite to the sign of the effective refractive index change rates according to the position of the second layer.

6. The meta optical device of claim 5, wherein the first zone is wider than the second zone.

7. The meta optical device of claim 5, wherein each of the first zone and the second zone is at least one, and
wherein the first zone and the second zone are alternately provided in one direction in each of the plurality of phase modulation regions.

8. The meta optical device of claim 5, wherein a refractive index of each of the plurality of first nanostructures is higher than a refractive index of the first surrounding material, and
wherein a refractive index of each of the plurality of second nanostructures is lower than a refractive index of the second surrounding material.

9. The meta optical device of claim 8, wherein widths of the plurality of first nanostructures monotonically change in one direction in a partial region within each of the plurality of phase modulation regions, and
wherein an increase or decrease of widths of each of the plurality of second nanostructures in the one direction changes one or more times in the partial region.

10. The meta optical device of claim 8, wherein the plurality of first nanostructures and the plurality of second nanostructures have a pillar shape.

11. The meta optical device of claim 8, wherein each of the plurality of second nanostructures comprises a hole provided adjacent to the second surrounding material.

12. The meta optical device of claim 8, wherein each of the plurality of second nanostructures comprises an inner pillar and a shell pillar provided adjacent to the inner pillar.

13. The meta optical device of claim 12, wherein the inner pillar includes a material having a refractive index lower than the refractive index of the second surrounding material, and the shell pillar includes a material having a refractive index higher than the refractive index of the inner pillar.

14. The meta optical device of claim 8, wherein each of the plurality of first nanostructures and each of the plurality of second nanostructures have a height to width ratio greater than 2.

15. The meta optical device of claim 8, wherein a height of each of the plurality of first nanostructures and a height of each of the plurality of second nanostructures are greater than a central wavelength of a shortest wavelength band among the plurality of wavelength bands.

16. The meta optical device of claim 1, wherein the plurality of phase modulation regions are provided in a radial direction from a center of the meta optical device, and wherein widths of the plurality of phase modulation regions decrease as a distance from the center increases.

17. The meta optical device of claim 1, wherein widths of the plurality of phase modulation regions are equal to each other.

18. An electronic apparatus comprising:
a lens assembly comprising a meta optical device that comprises:
a plurality of phase modulation regions respectively comprising a plurality of nanostructures and configured to modulate a phase of incident light,
wherein a phase retardation profile of the plurality of phase modulation regions monotonically change with respect to light of a plurality of wavelength bands apart from each other,
wherein phase modulation ranges with respect to the light of the plurality of wavelength bands are different from each other,
wherein each of the plurality of phase modulation regions has a phase modulation range of $2\pi*L$, $2\pi*M$, and $2\pi*N$, where $|L|\geq 1$, $|M|\geq 1$, $|N|\geq 1$, $L\neq M\neq N$, with respect to the light of the plurality of wavelength bands, and
wherein when central wavelengths of the plurality of wavelength bands are $\lambda 1$, $\lambda 2$, and $\lambda 3$, $L*21=M*\lambda 2=N*\lambda 3$ is satisfied; and
an image sensor configured to convert an optical image formed by the lens assembly into an electrical signal.

19. An electronic apparatus comprising:
an image projector; and
a light transmitter configured to transmit image light from the image projector to a certain position, the light transmitter comprising a meta optical device that comprises:
a plurality of phase modulation regions respectively comprising a plurality of nanostructures and configured to modulate a phase of incident light,
wherein a phase retardation profile of the plurality of phase modulation regions monotonically change with respect to light of a plurality of wavelength bands apart from each other,
wherein phase modulation ranges with respect to the light of the plurality of wavelength bands are different from each other, and
wherein each of the plurality of phase modulation regions comprises:
a first layer comprising a plurality of first nanostructures and a first surrounding material provided adjacent to the plurality of first nanostructures;
a second layer provided on the first layer and comprising a plurality of second nanostructures and a second surrounding material provided adjacent to the plurality of second nanostructures; and
a first zone in which sign of effective refractive index change rates corresponding to a position of the first layer is equal to the sign of the effective refractive index change rates according to the position of the second layer, and a second zone in which the sign of the effective refractive index change rates corresponding to the position of the first layer is opposite to the sign of the effective refractive index change rates according to the position of the second layer.

* * * * *